(12) United States Patent
Misawa et al.

(10) Patent No.: US 10,718,995 B2
(45) Date of Patent: Jul. 21, 2020

(54) SETTING DEVICE, SETTING METHOD, SETTING PROGRAM, AND CAMERA

(71) Applicant: FUJIFILM Corporation, Tokyo (JP)

(72) Inventors: Atsushi Misawa, Saitama (JP); Kentaro Tokiwa, Saitama (JP); Hirofumi Horii, Saitama (JP); Yuichi Fujimura, Saitama (JP); Takeshi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/199,986

(22) Filed: Nov. 26, 2018

(65) Prior Publication Data

US 2019/0094659 A1 Mar. 28, 2019

Related U.S. Application Data

(63) Continuation of application No. PCT/JP2017/014039, filed on Apr. 4, 2017.

(30) Foreign Application Priority Data

Jun. 14, 2016 (JP) ................... 2016-117867

(51) Int. Cl.
*G03B 17/02* (2006.01)
*H04N 5/225* (2006.01)
(Continued)

(52) U.S. Cl.
CPC ............. *G03B 17/02* (2013.01); *G03B 17/00* (2013.01); *G03B 17/18* (2013.01);
(Continued)

(58) Field of Classification Search
CPC ............... H01H 19/001; H04N 5/2251; H04N 5/23245; H04N 5/232; H04N 5/225;
(Continued)

(56) References Cited

U.S. PATENT DOCUMENTS 5,365,292 A * 11/1994 Wakabayashi ......... G03B 17/18
396/281
5,913,086 A 6/1999 Kawamura et al.
(Continued)

FOREIGN PATENT DOCUMENTS

CN 101750850 A 6/2010
DE 19929973 A1 1/2001
(Continued)

OTHER PUBLICATIONS

German Office Action, dated Sep. 30, 2019, for German Application No. 112017002480.3, with an English translation.
(Continued)

*Primary Examiner* — Christopher E Leiby
(74) *Attorney, Agent, or Firm* — Birch, Stewart, Kolasch & Birch, LLP

(57) ABSTRACT

Provided are a setting device, a setting method, a setting program, and a camera that are capable of preventing erroneous operations with compact configurations. A display unit is provided on an upper surface of a shutter speed dial. The display unit displays a dial plate image. The dial plate image includes an image picture of a lock release button. A rotation detection unit detects that the shutter speed dial is rotationally operated. A touch sensor detects that the lock release button is pressed. In a case where the shutter speed dial is rotationally operated while the lock release button is pressed, a shutter speed is switched.

20 Claims, 25 Drawing Sheets

(51) Int. Cl.
  *G03B 17/18* (2006.01)
  *H04N 5/232* (2006.01)
  *G03B 17/00* (2006.01)
  *H01H 19/00* (2006.01)
(52) U.S. Cl.
  CPC .......... *H01H 19/001* (2013.01); *H04N 5/225* (2013.01); *H04N 5/2251* (2013.01); *H04N 5/232* (2013.01); *H04N 5/23245* (2013.01); *G03B 2217/002* (2013.01)
(58) Field of Classification Search
  CPC ........ G03B 17/02; G03B 17/18; G03B 17/00; G03B 2217/002
  See application file for complete search history.

(56) References Cited

U.S. PATENT DOCUMENTS

| | | | |
|---|---|---|---|
| 2006/0071912 A1* | 4/2006 | Hill | G06F 3/043 345/173 |
| 2012/0086846 A1 | 4/2012 | Fuh et al. | |
| 2012/0154301 A1* | 6/2012 | Kang | G06F 3/04817 345/173 |
| 2014/0143785 A1* | 5/2014 | Mistry | G06F 1/329 718/104 |

FOREIGN PATENT DOCUMENTS

| | | |
|---|---|---|
| JP | 7-134320 A | 5/1995 |
| JP | 9-133961 A | 5/1997 |
| JP | 2002-277919 A | 9/2002 |
| JP | 2008-165118 A | 7/2008 |
| JP | 2010-192223 A | 9/2010 |
| JP | 2014-202837 A | 10/2014 |
| JP | 2014-235197 A | 12/2014 |
| JP | 2015-125307 A | 7/2015 |

OTHER PUBLICATIONS

International Preliminary Report on Patentability and Written Opinion of the International Authority(Forms PCT/IB/326, PCT/IB/373 and PCT/ISA/237), dated Dec. 27, 2018, for International Application No. PCT/JP2017/014039, with an English Translation of the Written Opinion.

International Search Report (Form PCT/ISA/210), dated Jun. 20, 2017, for International Application No. PCT/JP2017/014039, with an English translation.

Chinese Office Action and Search Report for corresponding Chinese Application No. 201780037183.6, dated May 7, 2020, with an English translation of the Office Action.

* cited by examiner

FIG. 8

| | SHUTTER SPEED | DISPLAY ON DISPLAY SECTION |
|---|---|---|
| 1 | AUTO | A |
| 2 | BULB | B |
| 3 | TIME | T |
| 4 | 1 SECOND | 1 |
| 5 | 1/2 SECOND | 2 |
| 6 | 1/4 SECOND | 4 |
| 7 | 1/8 SECOND | 8 |
| 8 | 1/15 SECOND | 15 |
| 9 | 1/30 SECOND | 30 |
| 10 | 1/60 SECOND | 60 |
| 11 | 1/125 SECOND | 125 |
| 12 | 1/180 SECOND | 180 |
| 13 | 1/250 SECOND | 250 |
| 14 | 1/500 SECOND | 500 |
| 15 | 1/1000 SECOND | 1000 |
| 16 | 1/2000 SECOND | 2000 |
| 17 | 1/4000 SECOND | 4000 |

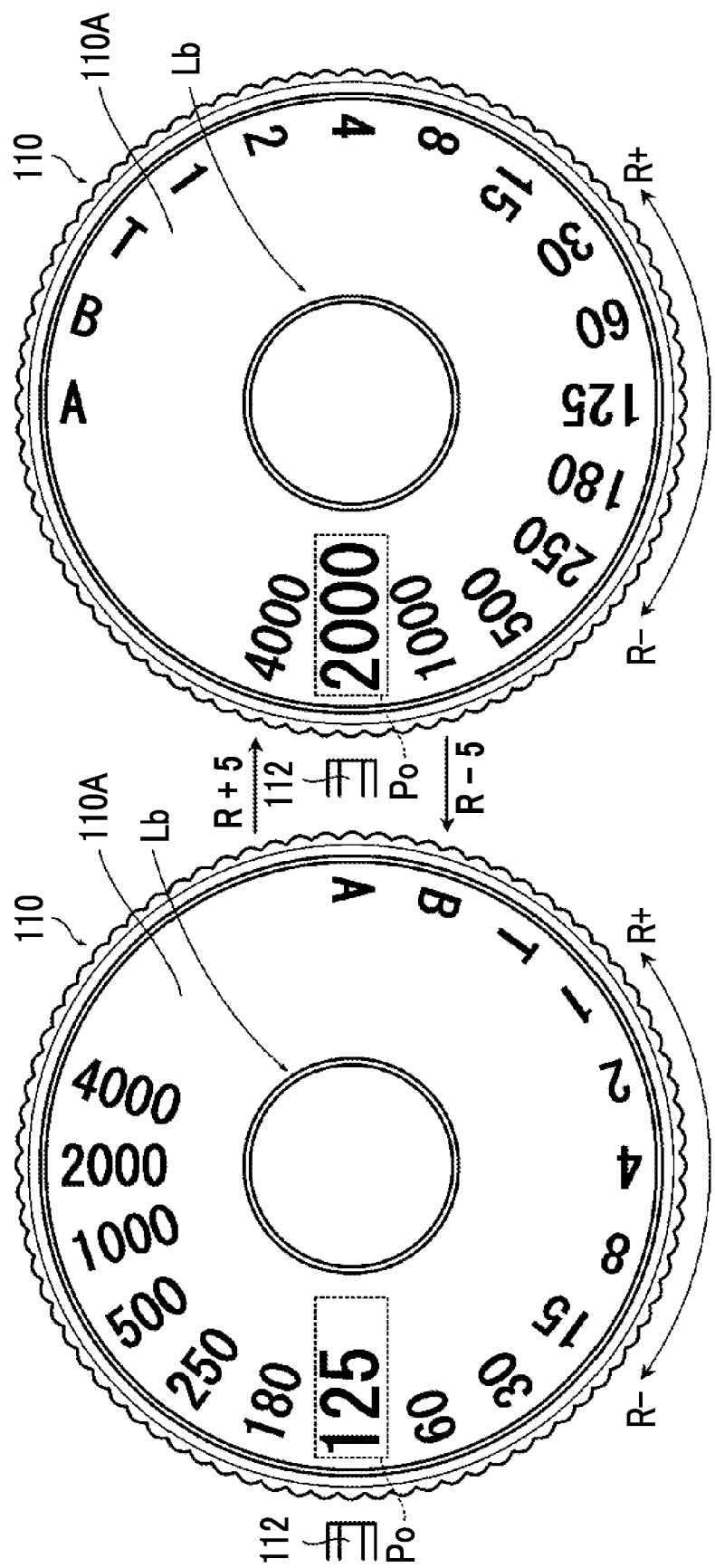

SETTING DEVICE, SETTING METHOD, SETTING PROGRAM, AND CAMERA

CROSS-REFERENCE TO RELATED APPLICATIONS

This application is a Continuation of PCT International Application No. PCT/JP2017/014039 filed on Apr. 4, 2017, which claims priority under 35 U.S.C § 119(a) to Japanese Patent Application No. 2016-117867 filed on Jun. 14, 2016. Each of the above application(s) is hereby expressly incorporated by reference, in its entirety, into the present application.

BACKGROUND OF THE INVENTION

1. Field of the Invention

The present invention relates to a setting device, a setting method, a setting program, and a camera, and particularly to a setting device that uses a rotary operation dial, a setting method, and a setting program and to a camera that comprises the setting device that uses the rotary operation dial.

2. Description of the Related Art

Since a setting device that uses a rotary operation dial can be intuitively operated and the set state of the setting device can also be confirmed at a glance, the setting device is employed in a lot of apparatuses. From a long time ago, the setting device that uses the rotary operation dial has been used particularly in a camera as means for setting various imaging conditions (for example, shutter speed, sensitivity, exposure correction value, imaging mode, or the like).

JP2008-165118A discloses a setting device comprising a display unit on an upper surface of an operation dial as this type of the setting device. In the setting device of JP2008-165118A, a display on the display unit is switched in response to a rotation operation of the operation dial. JP2014-202837A discloses a setting device comprising a display unit and a touch panel on the upper surface of an operation dial. In the setting device of JP2014-202837A, an item displayed on the display unit is switched by a touch operation on the touch panel.

There may be a case where this type of the setting device is provided with a mechanism for preventing a setting from being changed unintentionally. For example, JP1995-134320A (JP-H07-134320A) and JP2015-125307A disclose setting devices comprising mechanisms that mechanically lock operation dials. Further, JP2002-277919A discloses a setting device comprising means for prohibiting a change in a setting such that the setting is not changed even in a case where an operation dial is rotationally operated.

SUMMARY OF THE INVENTION

However, in the case where the mechanisms that mechanically lock the operation dials are comprised as disclosed in JP1995-134320A and JP2015-125307A, there are disadvantages that structures of the operation dials become complicated. Since an object of the operation dial comprising the display unit on the upper surface particularly is to simplify the mechanism by digitization so as not to be broken or to lower the cost, there is a disadvantage that the effect of digitization deteriorates in the case where the mechanism that mechanically locks the operation dial is added.

As disclosed in JP2002-277919A, in the case where the means for prohibiting the change in the setting is provided separately from the operation dial and the change in the setting by the operation dial is prohibited, there is a disadvantage that operability is reduced.

The invention has been made in consideration of the above-mentioned circumstances, and an object of the invention is to provide a setting device, a setting method, a setting program, and a camera that are capable of preventing erroneous operations with compact configurations.

Means for achieving the above-mentioned object are as follows.

(1) A setting device comprising:
an operation dial that is rotatable;
a display unit that is provided on an upper surface of the operation dial;
a contact detection unit that detects contact with the upper surface of the operation dial;
a rotation detection unit that detects a rotation of the operation dial;
a setting switching unit that sequentially switches a setting according to the rotation of the operation dial only in a case where the contact with the upper surface of the operation dial is detected; and
a display control unit that controls a display of the display unit.

According to the embodiment, the switching of the setting becomes valid only in a case where the contact detection unit that detects the contact with the upper surface of the operation dial is provided and the contact is detected by the contact detection unit. That is, the setting can be switched only in the case where the contact is detected by the contact detection unit. Therefore, in a case where the contact is not detected by the contact detection unit, the setting cannot be switched even in a case where the operation dial is rotationally operated. Accordingly, it is possible to prevent an erroneous operation. Further, since the contact is detected and thus the lock is electronically released, it is also possible to simplify a structure of the operation dial. In particular, a structure that is compact as a whole and hard to break can be achieved in combination with the digitization of the display section on the upper surface of the operation dial.

(2) The setting device according to (1),
wherein the contact detection unit detects the contact with the rotation center of the operation dial.

According to the embodiment, the contact detection unit detects the contact with the rotation center of the operation dial.

(3) The setting device according to (1) or (2),
wherein the display control unit displays an image picture of a lock release button on the rotation center of the operation dial and displays a currently selected setting at a current setting display position.

According to the embodiment, the currently selected setting and the image picture of the lock release button are displayed on the display unit provided on the upper surface of the operation dial. It is possible to easily set a desired setting by displaying the currently selected setting at the current setting display position. Further, the operation can be intuitively performed and thus even for a user who uses the operation dial for the first time can use the dial without being confused by displaying the image picture of the lock release button on the rotation center of the operation dial.

(4) The setting device according to (3),
wherein the contact detection unit detects contact with a display section of the image picture of the lock release button.

According to the embodiment, the contact with the display section of the image picture of the lock release button is detected to detect the contact on the upper surface of the operation dial.

(5) The setting device according to (3) or (4),
wherein the contact detection unit has a detection region corresponding to a display region of the image picture of the lock release button.

According to the embodiment, the region corresponding to the display region of the image picture of the lock release button is set as the detection region of the contact detection unit. "The detection region corresponding to the display region of the image picture of the lock release button is included" means that a region where the image picture of the lock release button is displayed is set as the detection region of the contact. That is, a portion where the image picture of the lock release button is displayed is the detection region of the contact.

(6) The setting device according to any one of (3) to (5), wherein the display control unit displays the currently selected setting displayed at the current setting display position and selectable settings side by side on the same circumference.

According to the embodiment, the setting displayed at the current setting display position and the selectable settings are displayed side by side on the same circumference.

(7) The setting device according to (6),
wherein the display control unit displays the currently selected setting displayed at the current setting display position larger than other selectable settings.

According to the embodiment, the setting displayed at the current setting display position is displayed larger than other selectable settings.

(8) A camera comprising:
the setting device according to any one of (1) to (7).

According to the embodiment, the camera is provided with the setting device according to any one of (1) to (7). Accordingly, it is possible to set an imaging condition or the like by using a rotary operation dial.

(9) The camera according to (8), further comprising:
a sound output unit that notifies by a sound that locked state is set in a case where the operation dial is rotated in the case of the locked state.

According to the embodiment, it is possible to notify the user that the locked state is set by the sound.

(10) The camera according to (8), further comprising:
a monitor that displays that locked state is set in the case where the operation dial is rotated in the case of the locked state.

According to the embodiment, it is possible to notify the user that the locked state is set by the display.

(11) A setting method comprising:
detecting contact with an upper surface of an endlessly rotatable operation dial;
validating switching of a setting by the operation dial in a case where the contact with the upper surface of the operation dial is detected; and
switching sequentially the setting in response to a rotation operation of the operation dial in a case where the switching of the setting by the operation dial is valid.

According to the embodiment, it is possible to switch the setting only in the case the operation dial is rotationally operated while the upper surface of the operation dial is touched.

(12) A setting program causing a computer to realize functions, the program comprising:

a function of determining the presence or absence of contact with an upper surface of an operation dial based on an output from a contact detection unit provided on the upper surface of the endlessly rotatable operation dial;
a function of validating switching of a setting by the operation dial in a case where the contact with the upper surface of the operation dial is determined to be present; and
a function of switching sequentially the setting in response to a rotation operation of the operation dial in a case where the switching of the setting by the operation dial is valid.

According to the embodiment, it is possible to switch the setting only in the case the operation dial is rotationally operated while the upper surface of the operation dial is touched.

According to the invention, it is possible to prevent the erroneous operations with the compact configurations.

BRIEF DESCRIPTION OF THE DRAWINGS

FIG. 8 is a list of shutter speeds that can be set by a digital camera of the embodiment and notations of the shutter speeds on a display unit.

FIGS. 11A and 11B are transition diagrams of displays of dial plate images in response to a rotation operation of the shutter speed dial.

DESCRIPTION OF THE PREFERRED EMBODIMENTS

A preferred embodiment of the invention will be described in detail below with reference to accompanying drawings.

«Appearance»

Figure 1:
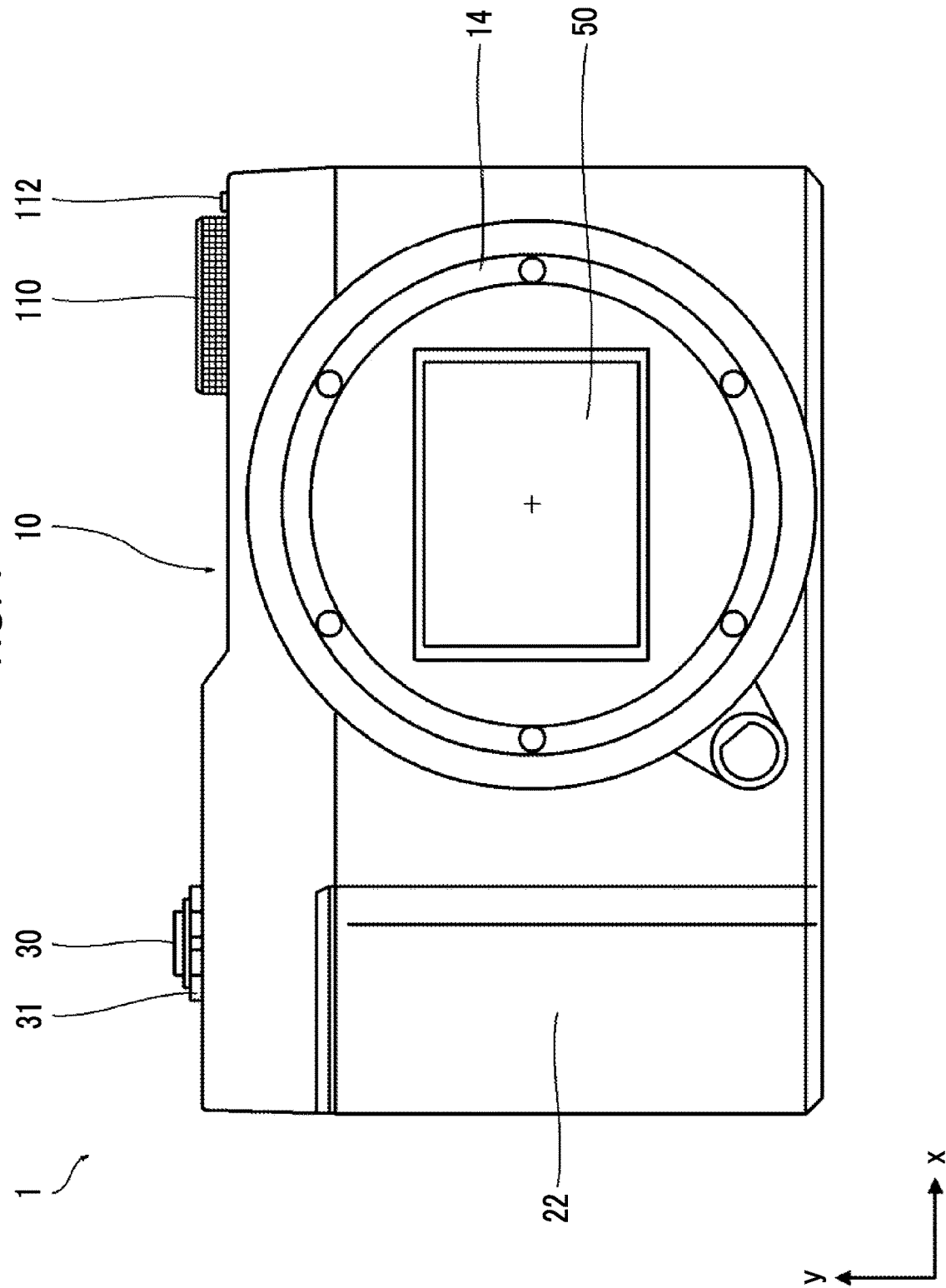
FIG. 1 is a front view showing the appearance of a digital camera.
Figure 2:
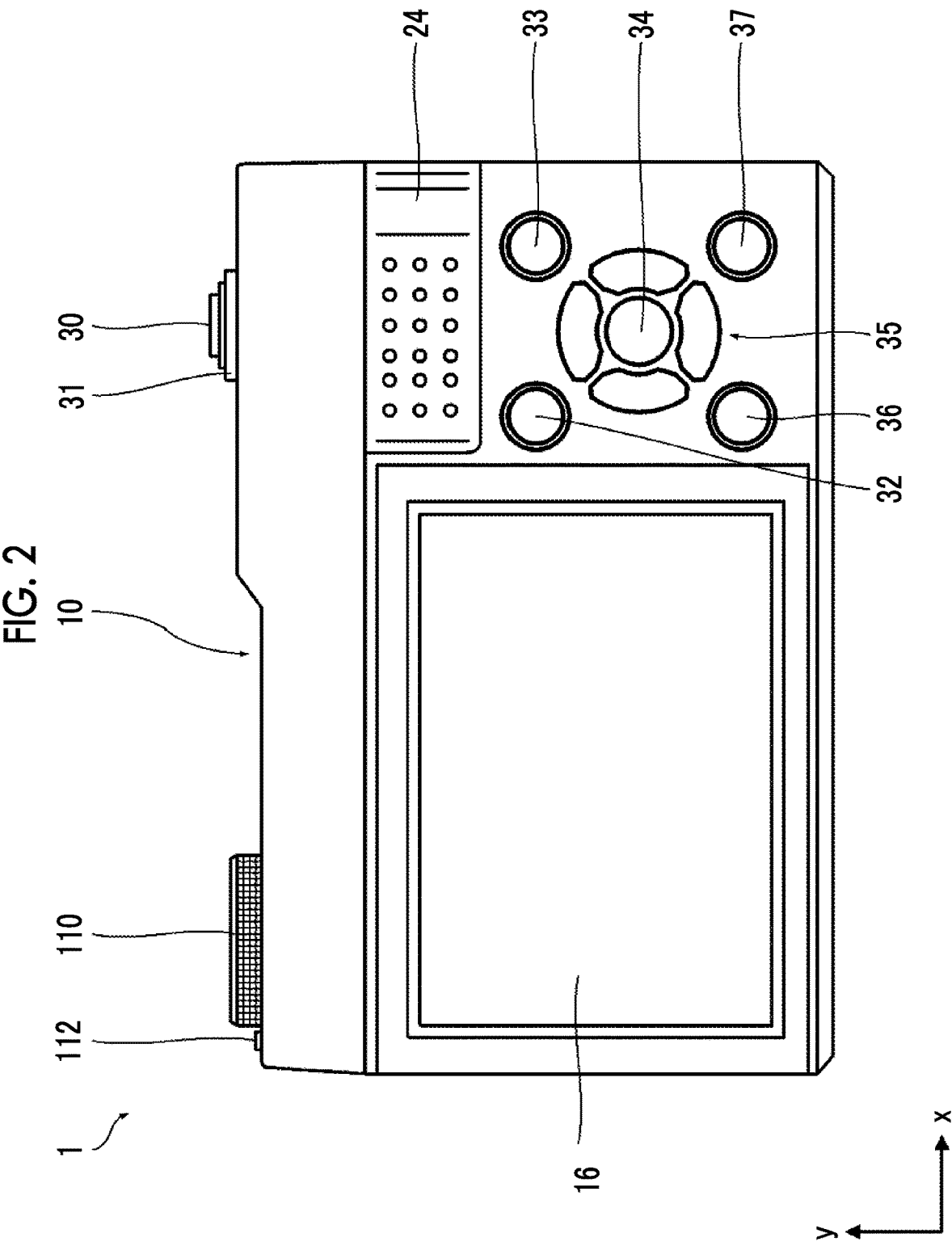
FIG. 2 is a back view showing the appearance of the digital camera.
Figure 3:
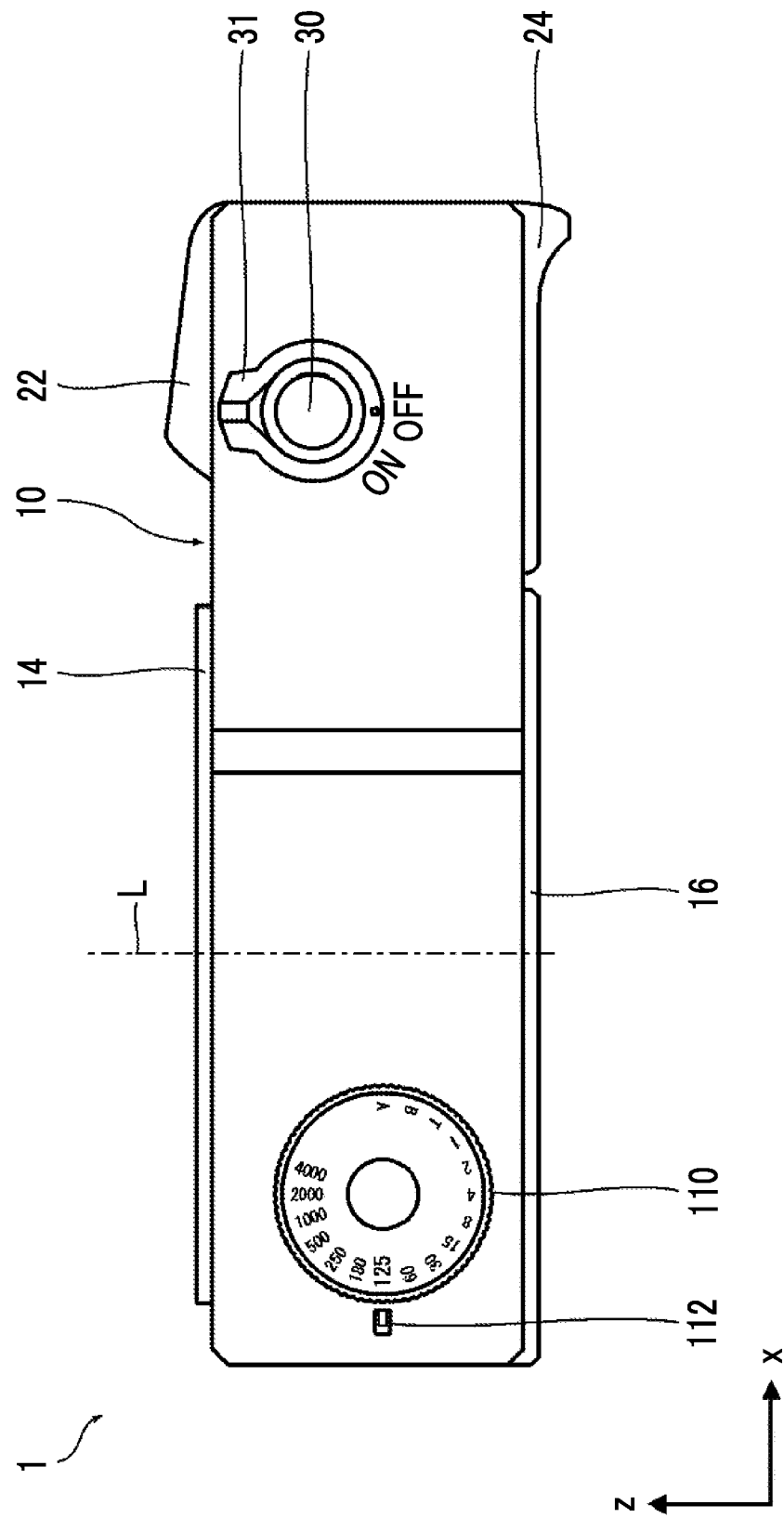
FIG. 3 is a plan view showing the appearance of the digital camera.

FIGS. 1, 2, and 3 are a front view, a back view, and a plan view showing the appearance of a digital camera, respectively.

In this specification, a direction along an optical axis L (a z direction in FIG. 3) is referred to as a front-rear direction and a subject side is referred to as a front direction. Further, on a plane orthogonal to the optical axis L, a direction along a long side of an image sensor 50 (an x direction in FIG. 1) is referred to as a lateral direction or a left-right direction and a direction along a short side of the image sensor 50 (a y direction in FIG. 1) is referred to as a vertical direction or an up-down direction.

A digital camera 1 of this embodiment is a lens-interchangeable digital camera, and is a non-reflex digital camera. The lens-interchangeable digital camera is a digital camera of which a lens can be interchanged. The non-reflex digital camera is a digital camera not including a reflex mirror for guiding incident light from a lens to an optical finder, and is also referred to as a mirrorless digital camera.

Figure 4:
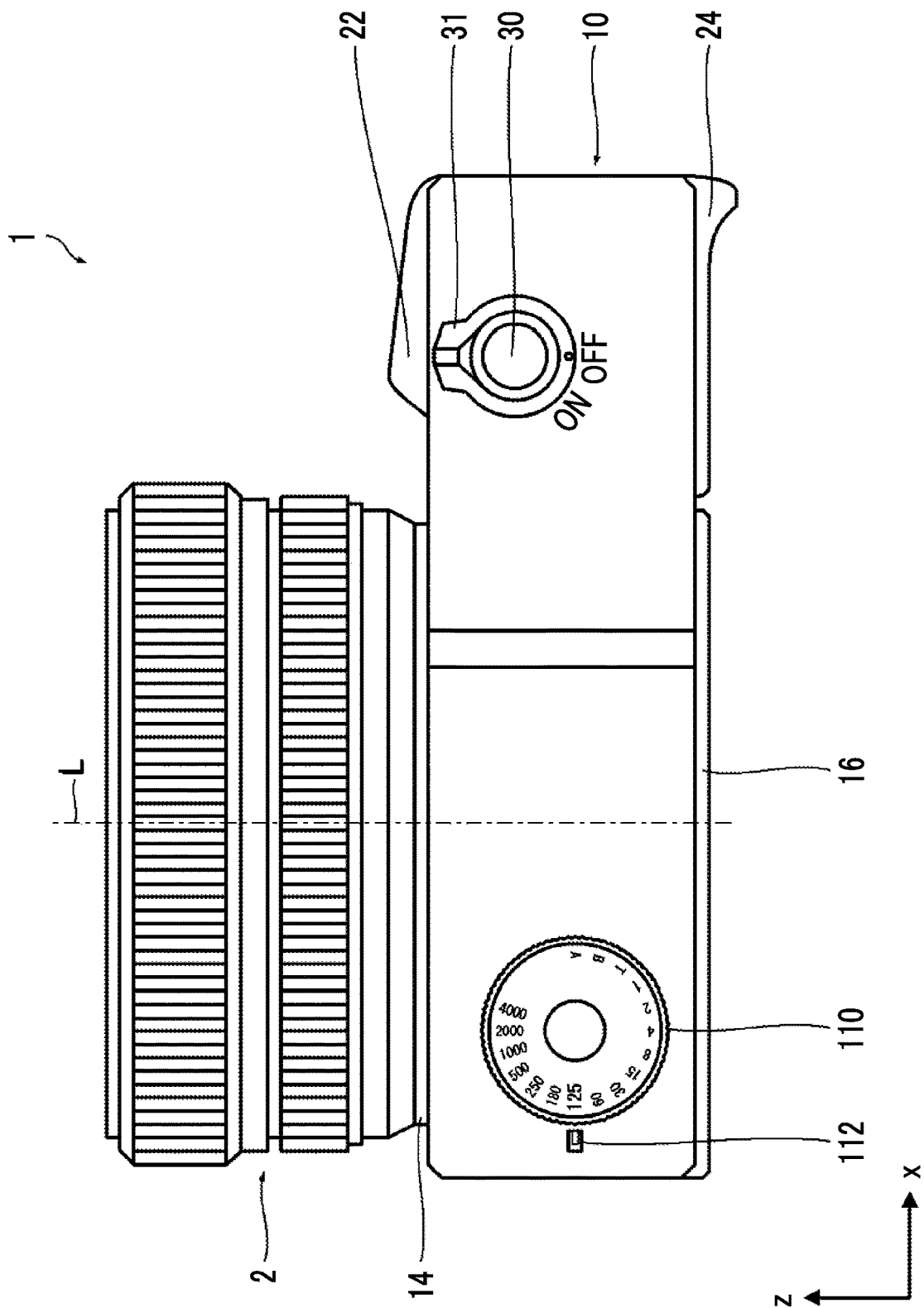
FIG. 4 is a plan view of the digital camera on which a lens is mounted.

FIG. 4 is a plan view of the digital camera on which a lens is mounted. As shown in FIG. 4, the digital camera 1 of this embodiment is used in a state in which a lens 2 is mounted on a camera body 10. The camera body 10 is provided with a lens mount 14 for mounting the lens 2, a monitor 16 for displaying an image, various operation members for operating the digital camera 1, and the like.

<Camera Body>

The camera body 10 has the shape of a rectangular box that is thin in the front-rear direction. One (left side in FIG. 1) end portion of the camera body 10 is formed as a grip portion. A user grips the grip portion to perform a release operation. The grip portion is provided with a grip 22 on the front surface side and a thumb rest 24 on the back surface side.

<Lens Mount>

The lens mount 14 is a mounting portion for the lens 2. As shown in FIG. 1, the lens mount 14 is provided on the front surface of the camera body 10. The lens 2 is mounted on the lens mount 14 attachably and detachably.

<Monitor>

As shown in FIG. 2, the monitor 16 is provided on the back surface of the camera body 10. The monitor 16 is formed of, for example, a color liquid crystal display (LCD). The monitor 16 is used to display an image and is also used as a graphical user interface (GUI). The image displayed on the monitor 16 includes a live view image. The live view is to display an image captured by an image sensor on the monitor 16 in real time. The live view image is an image that is viewed lively. In a case where the digital camera 1 is set to an imaging mode, the live view image is displayed on the monitor 16. At the time of imaging, the user views the display on the monitor 16 to confirm the angle of view, a focus state, and the like.

<Operation Member>

The camera body 10 is provided with a shutter button 30, a power supply lever 31, a playback button 32, an imaging setting button 33, a menu/OK button 34, selector buttons 35, a display/BACK button 36, a delete button 37, a shutter speed dial 110, and the like as the operation members for operating the digital camera 1.

The shutter button 30 is provided on an upper surface of the camera body 10 on a grip portion side. The shutter button 30 is formed of a so-called two-stage switch that has a half-pressed stage and a fully-pressed stage. In a case where the shutter button 30 is half pressed, an imaging preparation such as photometry and distance measurement is performed. In a case where the shutter button 30 is fully pressed, main imaging is performed.

The power supply lever 31 is disposed coaxially with the shutter button 30. The power supply lever 31 is formed of a rotary lever. In a case where the power supply lever 31 is rotated to an ON position, a power supply of the digital camera 1 is turned on. In a case where the power supply lever 31 is rotated to an OFF position, the power supply of the digital camera 1 is turned off.

The playback button 32 is a button that switches a mode of the digital camera 1 to a playback mode. The playback button 32 is provided on the back surface of the camera body 10. In a case where the playback button 32 is pressed in a state where the mode of the digital camera 1 is set to the imaging mode, the mode of the digital camera 1 is switched to the playback mode. In the case where the playback mode is set, the last captured image is displayed on the monitor 16.

A function of switching from the playback mode to the imaging mode is assigned to the shutter button 30. In a case where the shutter button 30 is pressed in a state where the playback mode is set, the mode of the digital camera 1 is switched to the imaging mode.

The imaging setting button 33 is a button that displays a setting screen of an imaging condition on the monitor 16. The imaging setting button 33 is provided on the back surface of the camera body 10. In a case where the imaging setting button 33 is pressed, a screen for setting various imaging conditions such as the imaging mode, a focus mode, sensitivity, an image size, an image quality mode, and a self-timer is displayed on the monitor 16. The user performs a desired setting by using the selector buttons 35 and the like according to the display on the monitor 16.

The menu/OK button 34 is a button that calls a menu screen on the monitor 16. The menu/OK button 34 is a button that instructs OK for a selection item, a confirmation item, or the like displayed on the monitor 16. The menu/OK button 34 is provided on the back surface of the camera body 10. In a case where the menu/OK button 34 is pressed in a state where the imaging mode or the playback mode is set, the menu screen is displayed on the monitor 16.

The selector buttons 35 is formed of four buttons of up, down, left, and right disposed on the same circle with the menu/OK button 34 as the center. A function according to a setting situation of the digital camera 1 is assigned to each button. For example, in the case where the digital camera 1 is set to the playback mode, in FIG. 2, a function of one-frame advance is assigned to the button in the right direction, and a function of one-frame return is assigned to the button in the left direction. A function of zoom-in is assigned to the button in the upper direction, and a function of zoom-out is assigned to the button in the lower direction. In the case where the digital camera 1 is set to the imaging mode, in FIG. 2, a function of calling the setting screen of white balance is assigned to the button in the right direction, and a function of calling the setting screen of the self-timer is assigned to the button in the left direction. A function of calling the setting screen of an auto focus (AF) mode is assigned to the button in the upper direction, and a function of calling the setting screen of a consecutive imaging mode is assigned to the button in the lower direction. Further, in a case where the various setting screens are called on the monitor 16, the four buttons function as buttons that move a cursor in each direction on the screens.

The display/BACK button 36 is a button that instructs the switching of a display form of the monitor 16. The display/BACK button 36 is a button that performs an instruction to return the display on the monitor 16 to one previous state. The display/BACK button 36 is provided on the back surface of the camera body 10. In the state where the playback mode or the imaging mode is set, the display/BACK button 36 is pressed, the display form of the monitor 16 is switched. For example, in a case where the display/BACK button 36 is pressed in the state where the playback mode is set, an imaging condition, histogram, and the like of an image displayed on the monitor 16 are displayed on the image in an overlapped manner. For example, in a case where the display/BACK button 36 is pressed in the state where the imaging mode is set, various pieces of information such as the imaging condition or the histogram are displayed on the live view image in an overlapped manner. In a case where the display/BACK button 36 is pressed in a state where the various setting screens are displayed on the monitor 16, the display on the monitor 16 is returned to one previous state. Accordingly, it is possible to cancel the selection item, the confirmation item, or the like.

The delete button 37 is a button that performs an instruction to delete an imaged image displayed on the monitor 16. The delete button 37 is provided on the back surface of the camera body 10. In a case where the delete button 37 is pressed in the state where the imaged image is displayed on the monitor 16, a screen that confirms the deletion is displayed on the monitor 16. In a case where the instruction to delete is executed according to the display on the monitor 16, the imaged image during playback is deleted from a memory card.

The shutter speed dial 110 is an example of an operation dial and is used for setting a shutter speed. The shutter speed dial 110 is provided on the upper surface of the camera body 10. In the digital camera 1 of the embodiment, the shutter speed dial 110 is provided on an end portion opposite to the grip portion. The user rotationally operates the shutter speed dial 110 to set the shutter speed at the time of imaging. A configuration of the setting device of the shutter speed including the shutter speed dial 110 will be described below in detail.

«Control System»

Figure 5:
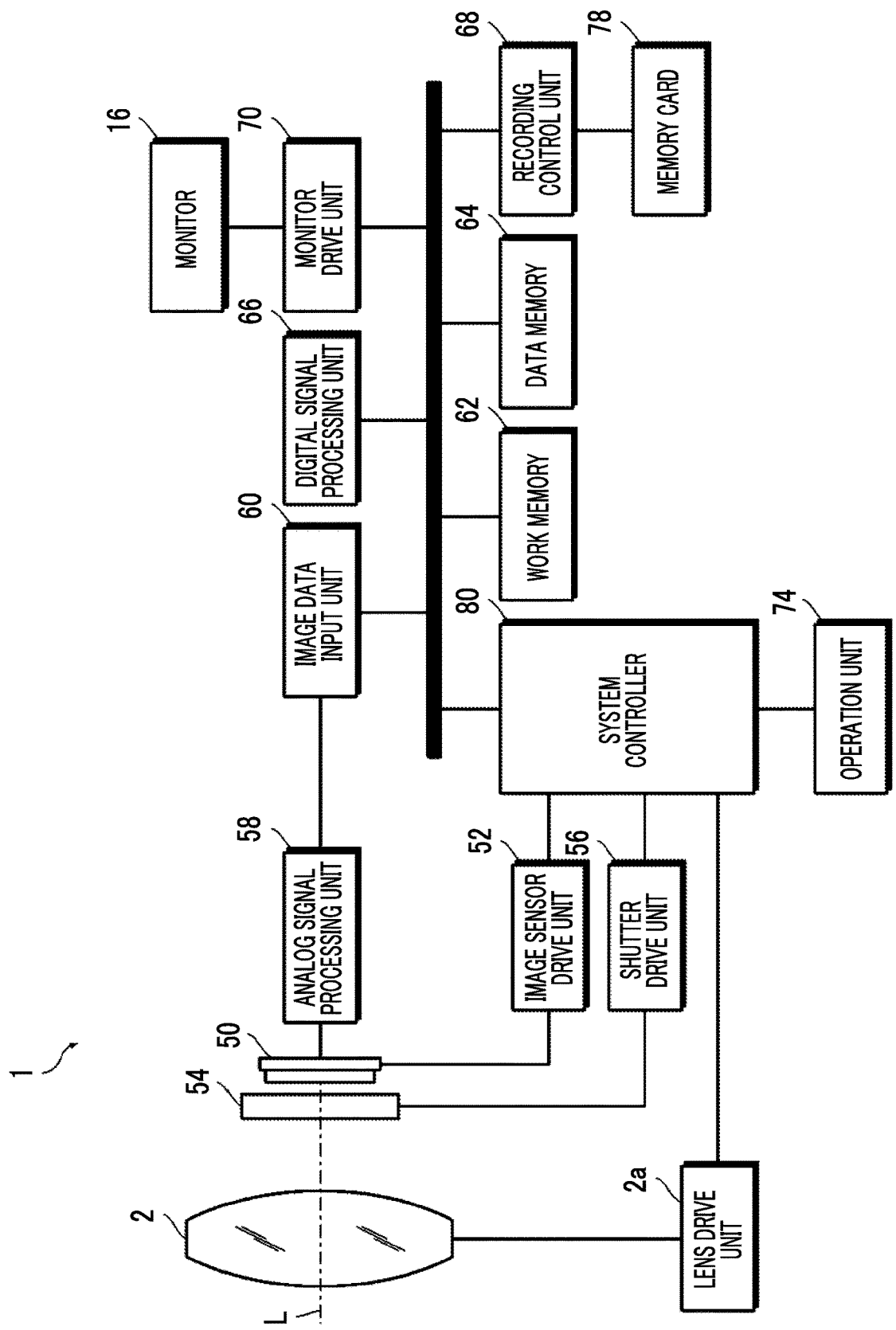
FIG. 5 is a block diagram showing the schematic configuration of a control system of the digital camera.

FIG. 5 is a block diagram showing the schematic configuration of a control system of the digital camera.

The digital camera 1 includes an image sensor 50, an image sensor drive unit 52, a shutter 54, a shutter drive unit 56, an analog signal processing section 58, an image data input unit 60, a work memory 62, a data memory 64, a digital signal processing section 66, a recording control unit 68, a monitor drive unit 70, an operation unit 74, a system controller 80, and the like.

The image sensor 50 converts an optical image of a subject, which is formed through the lens 2, into electrical signals and outputs the electrical signals. A publicly known image sensor, such as a charged coupled device (CCD) image sensor or a complementary metal oxide semiconductor (CMOS) image sensor, is used as the image sensor 50.

The image sensor drive unit 52 drives the image sensor 50 according to a command output from the system controller 80.

The shutter 54 is formed of a square type focal-plane shutter and is disposed directly in front of the image sensor 50. FIG. 1 shows a state where the shutter is fully opened.

The shutter drive unit 56 drives the shutter 54 according to a command output from the system controller 80.

The analog signal processing section 58 receives the signals output from the image sensor 50 and performs required signal processing, such as correlative double sampling processing and amplification processing. Further, the analog signal processing section 58 converts analog image signals subjected to the required signal processing, into digital image signals and outputs the digital image signals.

The image data input unit 60 receives the digital image signals to be output from the analog signal processing section 58, according to a command output from the system controller 80. Received image data corresponding to one sheet is stored in the work memory 62.

The work memory 62 is used as a memory for work. The data memory 64 is formed of a non-volatile memory, such as electrically erasable programmable read only memory (EEPROM), and data required for control and the like are stored in the data memory 64.

The digital signal processing section 66 performs required signal processing, such as demosaicing processing, white balance correction, gamma correction, and outline correction, on the image data received in the work memory 62, and generates predetermined image data formed of brightness data (Y data) and color difference data (Cr and Cb data).

The recording control unit 68 accesses a memory card 78, and reads and writes data according to a command output from the system controller 80. Image data obtained by imaging is recorded in the memory card 78.

The monitor drive unit 70 drives the monitor 16 according to a command output from the system controller 80.

The operation unit 74 includes the shutter button 30, the power supply lever 31, the playback button 32, the imaging setting button 33, the menu/OK button 34, the selector buttons 35, the display/BACK button 36, the delete button 37, the shutter speed dial 110, and the like, and outputs the signal in response to the operation of each operation member to the system controller 80.

The system controller 80 is a control unit that controls the operation of each unit of the digital camera 1. The system controller 80 is formed of a microcomputer. That is, the microcomputer functions as the system controller 80 by executing a predetermined control program, and functions as a control unit that controls the operation of each unit of the digital camera 1.

The system controller 80 also functions as a control unit for the lens 2. The system controller 80 controls the operation of the lens 2 through a lens drive unit 2a provided in the lens 2. The lens 2 comprises a stop, a focus lens, and the like. The lens drive unit 2a comprises a stop drive unit that drives the stop, a focus lens drive unit that drives the focus lens, and the like.

«Shutter Speed Setting Device»

As described above, the digital camera 1 of the embodiment sets the shutter speed at the time of imaging with the shutter speed dial 110.

Figure 6:
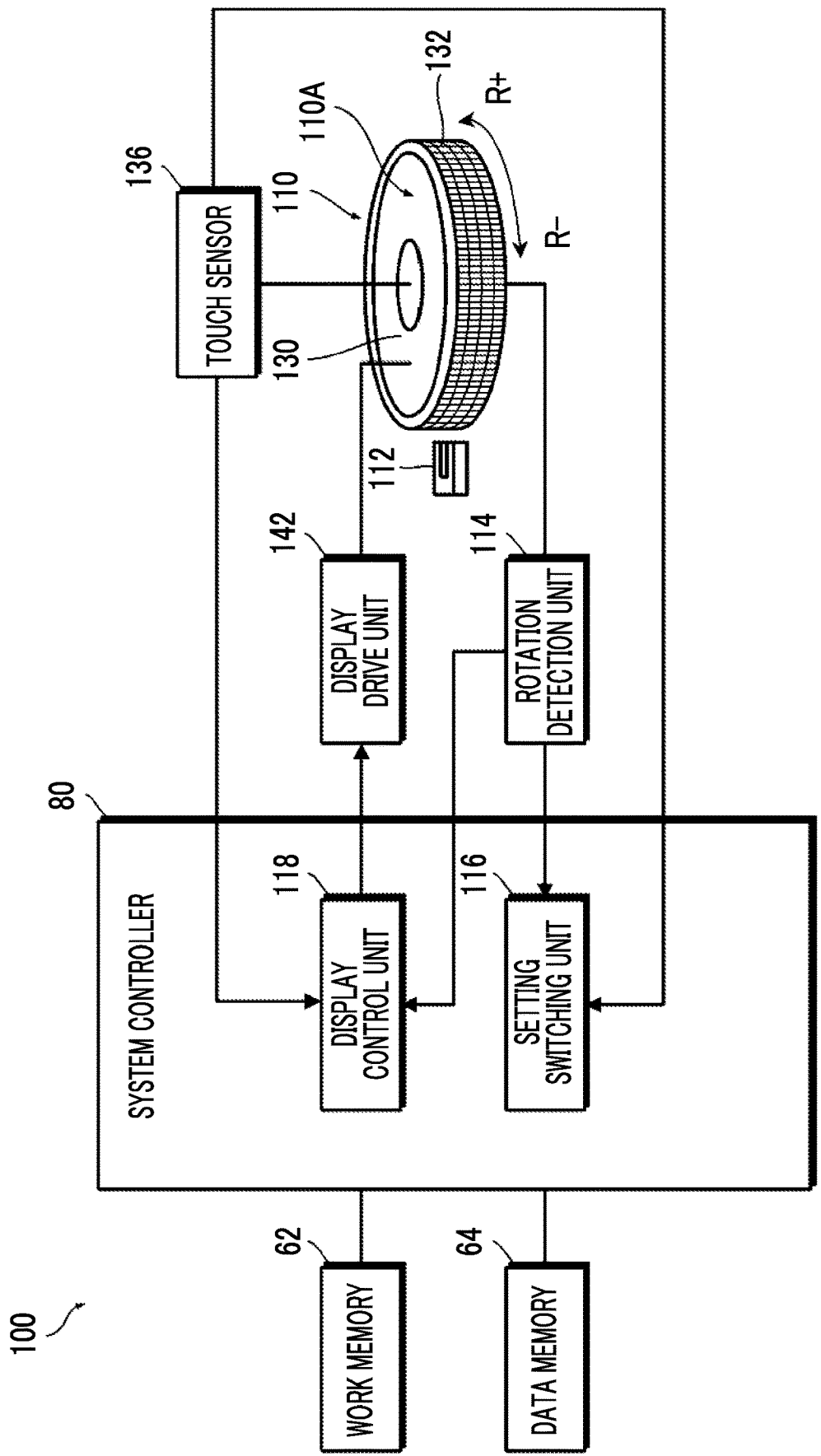
FIG. 6 is a block diagram showing the schematic configuration of a shutter speed setting device including a shutter speed dial.

FIG. 6 is a block diagram showing the schematic configuration of a shutter speed setting device including a shutter speed dial.

A shutter speed setting device 100 sets the shutter speed. The shutter speed setting device 100 is an example of the setting device. The shutter speed setting device 100 comprises the shutter speed dial 110 comprising a display unit 110A on the upper surface (top surface) thereof, an indicator 112, a rotation detection unit 114 that detects the rotation of the shutter speed dial 110, a setting switching unit 116 that switches the shutter speed in response to the operation of the shutter speed dial 110, and a display control unit 118 that controls the display on the display unit 110A in response to the operation of the shutter speed dial 110.

<Shutter Speed Dial>

Figure 7:
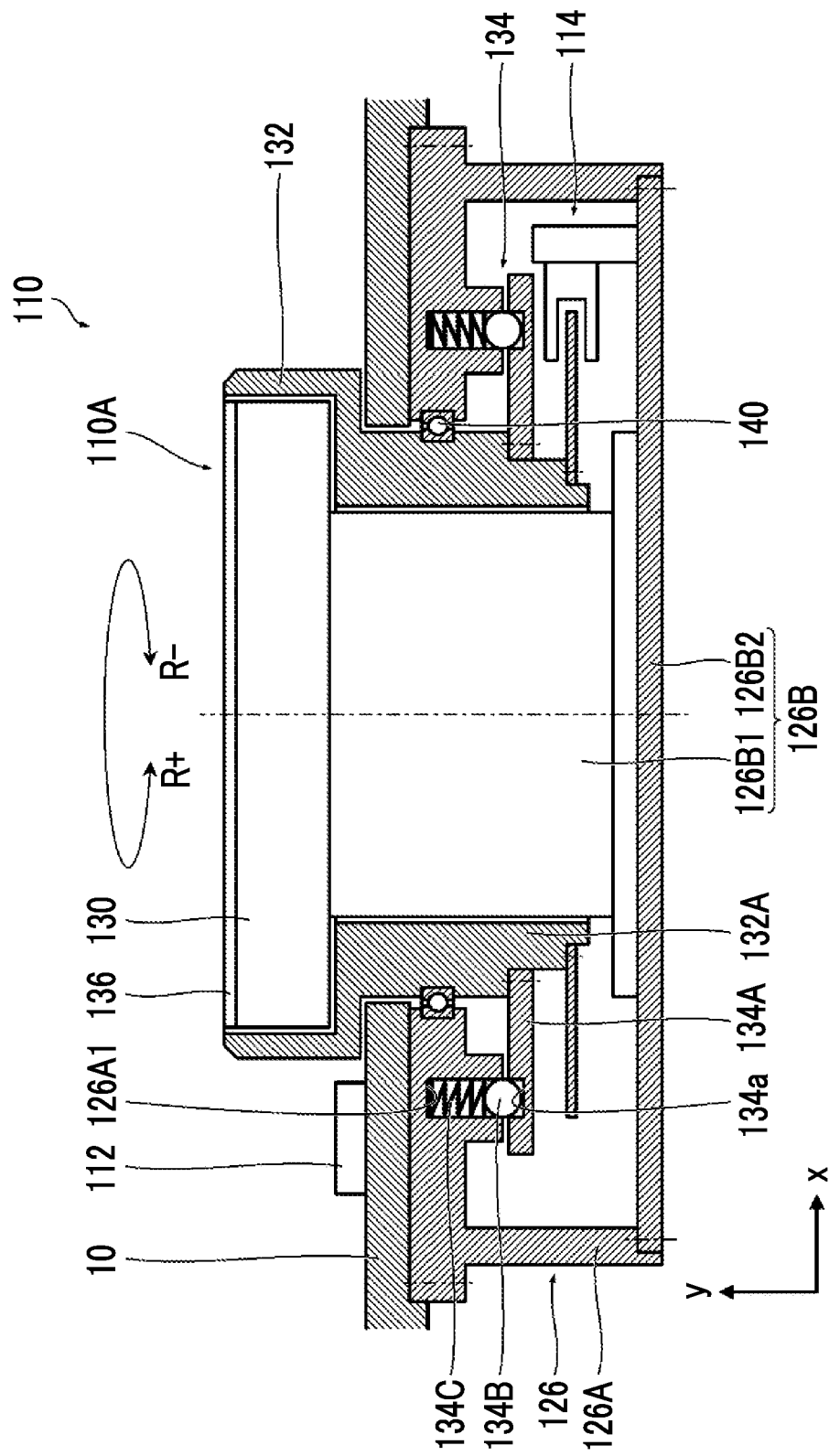
FIG. 7 is a longitudinal cross section view showing the schematic configuration of the shutter speed dial.

FIG. 7 is a longitudinal cross section view showing the schematic configuration of the shutter speed dial.

The shutter speed dial 110 is an example of the operation dial. The shutter speed dial 110 comprises a disc-shaped display 130 forming a dial plate, an endlessly rotatable operation ring 132, and a click mechanism 134 that generates a click feeling in the rotation operation of the operation ring 132.

[Display]

The display 130 forms the dial plate of the shutter speed dial 110. The display 130 has a display surface on the upper surface, and the display surface forms the upper surface of the shutter speed dial 110. That is, the display surface of the display 130 forms the display unit 110A of the shutter speed dial 110. The display 130 is formed of, for example, the LCD.

The display 130 is fixedly mounted on a shutter speed dial support frame 126 that supports the shutter speed dial 110.

The shutter speed dial support frame 126 has a support frame main body 126A and a display support frame 126B. The support frame main body 126A is fixedly mounted on the camera body 10.

The display support frame 126B has a base part 126B2 and a support part 126B1. The base part 126B2 has a plate shape and is fixedly mounted on the support frame main body 126A. The support part 126B1 has a columnar shape and is fixedly mounted on the base part 126B2. The display 130 is fixedly mounted on the top portion of the support part 126B1.

A touch sensor 136 that detects contact is provided on the display surface (upper surface) of the display 130. The touch sensor 136 is an example of the contact detection unit and detects the contact of a finger to the display surface of the display 130. As described above, since the display surface of the display 130 forms the upper surface of the shutter speed dial 110, the touch sensor 136 detects the contact with the upper surface of the shutter speed dial 110. A detection region of the touch sensor 136 is the entire surface of the display surface of the display 130.

[Operation Ring]

The operation ring 132 forms a rotation operation unit of the shutter speed dial 110. The operation ring 132 is provided so as to be endlessly rotatable the outer periphery of the display 130 in normal and reverse directions. The operation ring 132 has a cylindrical shaft portion 132A on the coaxially lower portion thereof. In the operation ring 132, the shaft portion 132A is supported by bearings 140 provided on the support frame main body 126A and is supported so as to be endlessly rotatable in normal and reverse directions. In this specification, in FIG. 7, a rotation direction (counterclockwise rotation direction) indicated by an arrow of a reference numeral R+ is referred to as a plus direction, and a rotation direction (clockwise rotation direction) indicated by an arrow of a reference numeral R− is referred to as a minus direction. The plus rotation direction R+ and the minus rotation direction R− are opposite to each other.

[Click Mechanism]

The click mechanism 134 generates the click feeling in the rotation operation of the operation ring 132. The click mechanism 134 comprises a click groove-metal plate 134A, click balls 134B, and click springs 134C.

The click groove-metal plate 134A has the shape of a disc that comprises a circular hole at the center thereof. The click groove-metal plate 134A is fixed to the shaft portion 132A of the operation ring 132 by passing the shaft portion 132A of the operation ring 132 through the center hole thereof. The click groove-metal plate 134A is disposed coaxially with the operation ring 132 and rotates together with the operation ring 132.

The click groove-metal plate 134A is provided with a plurality of click grooves 134a that are formed on the same circumference at regular intervals. The click grooves 134a are provided on the upper surface of the click groove-metal plate 134A as spherical depressions. The disposition interval of the click grooves 134a is an interval that generates the click feeling.

The click balls 134B are members that are fitted to the click grooves 134a and generate the click feelings. The click balls 134B are provided on the support frame main body 126A of the shutter speed dial support frame 126. The support frame main body 126A is provided with click ball-receiving holes 126A1 that receive the click balls 134B. The click ball-receiving holes 126A1 are provided parallel to the rotation axis of the operation ring 132 as bottom holes. Further, the click ball-receiving holes 126A1 are provided at positions facing the click grooves 134a.

The click springs 134C are members that bias the click balls 134B to the click groove-metal plate 134A. The click springs 134C are received in the click ball-receiving holes 126A1.

The action of the click mechanism 134 having the above-mentioned configuration is as follows. In a case where the operation ring 132 is rotated, the click groove-metal plate 134A is rotated. In a case where the click groove-metal plate 134A is rotated, the click balls 134B are fitted to the click grooves 134a at regular angular intervals. Accordingly, the click feelings are generated at regular angular intervals. Further, in a case where the rotation of the click groove-metal plate 134A is stopped at the time of generation of the click feeling, the click balls 134B are fitted to the click grooves 134a. Accordingly, the rotation of the click groove-metal plate 134A is stopped. That is, as long as the click groove-metal plate 134A is not rotated with a load equal to or larger than a certain level, a stop state of the click groove-metal plate 134A is maintained. The state where the click balls 134B are fitted to the click grooves 134a and the rotation of the click groove-metal plate 134A is stopped is referred to as click-stop.

In a case where a click-stop position is referred to as a click position, the number of click positions is the same as the number of click grooves 134a. The interval of the click positions is also the same as the interval of the click grooves 134a. For example, in a case where the number of click positions per rotation is 10, disposition interval of the click grooves 134a becomes 36°. In this case, in a case where the operation ring 132 is rotationally operated, the click feeling is generated at 36° interval. Further, it is possible to perform the click-stop at 36° interval.

<Rotation Detection Unit>

The rotation detection unit 114 detects the rotation direction and a rotation amount of the shutter speed dial 110. The rotation detection unit 114 is formed of a rotary encoder and detects the rotation of the shaft portion 132A of the operation ring 132 to detect the rotation direction and the rotation amount of the shutter speed dial 110. Accordingly, it is possible to detect an operation direction and an operation amount of the rotation of the shutter speed dial 110. For example, in the case where the number of click positions per rotation is 10, it is possible to detect that the shutter speed dial 110 is rotationally operated by one click in the plus direction R+ by detecting rotation by 36° in the plus direction R+. A detection result of the rotation detection unit 114 is output to the system controller 80.

<Indicator>

The indicator 112 is provided on the camera body 10. The indicator 112 has the shape of a bar and is disposed so as to indicate one point on the outer periphery of the shutter speed dial 110. In the digital camera 1 of this embodiment, as shown in FIG. 3, the indicator 112 is disposed on the shutter speed dial 110 at a position corresponding to nine o'clock.

A user rotationally operates the shutter speed dial 110 with the indicator 112 as the reference. That is, a user rotationally operates the shutter speed dial 110 such that the display of the shutter speed to be set is positioned at the position of the indicator 112.

<Setting Switching Unit>

The setting switching unit 116 switches the setting of the shutter speed based on the output from the touch sensor 136 and the output from the rotation detection unit 114. Specifically, in a case where the contact is detected by the touch sensor 136 and the rotation is detected by the rotation detection unit 114, the setting of the shutter speed is switched according to the detected rotation direction and rotation amount. Since a necessary condition is that the contact is detected by the touch sensor 136, in a case where the contact is not detected, the setting is not switched even in a case where the rotation is detected. That is, the operation becomes invalid, and a current setting is maintained.

The switching is performed by one click unit. Therefore, in a case where the shutter speed dial 110 is rotated by one click in the plus direction R+, the shutter speed is advanced by one stage. In a case where the shutter speed dial 110 is rotated by one click in the minus direction R−, the shutter speed is lowered by one stage.

FIG. 8 is a list of shutter speeds that can be set by the digital camera of the embodiment and notations of the shutter speeds on a display unit.

As shown in FIG. 8, in the digital camera 1 of the embodiment, the setting of the shutter speed can be set by selecting any of Auto, Bulb, Time, 1 second, ½ second, ¼ second, ⅛ second, 1/15 second, 1/30 second, 1/60 second, 1/125 second, 1/180 second, 1/250 second, 1/500 second, 1/1000 second, 1/2000 second, or 1/4000 second.

Here, the "Auto" is a mode in which the camera automatically decides the shutter speed at which a proper exposure is achieved. The "Bulb" is a mode in which a shutter is opened while the shutter button 30 is pressed and the shutter is closed while the shutter button 30 is released. The "Time" is a mode in which the user designates an exposure time, and is mainly used for a long-time exposure. The designation of the exposure time is separately performed.

The shutter speed is sequentially switched in order of Auto, Bulb, Time, 1 second, ½ second, ¼ second, ⅛ second, 1/15 second, 1/30 second, 1/60 second, 1/125 second, 1/180 second, 1/250 second, 1/500 second, 1/1000 second, 1/2000 second, or 1/4000 second. The shutter speed after 1/4000 second is auto. That is, the shutter speed loops in the above order.

Data of settable shutter speeds, that is, data of the table shown in FIG. 8 is stored in the data memory 64. The setting switching unit 116 reads the data of the settable shutter speeds from the data memory 64 and switches the setting of the shutter speed according to the rotation of the shutter speed dial 110 detected by the rotation detection unit 114.

The setting switching unit 116 is provided as one function of the system controller 80. That is, the system controller 80 executes the predetermined control program (setting program) to function as the setting switching unit 116.

<Display Control Unit>

The display control unit 118 controls the display on the display unit 110A. The display control unit 118 displays a predetermined dial plate image on the display unit 110A. The display control unit 118 changes the display on the display unit 110A in response to the operation of the shutter speed dial 110.

The display control unit 118 is provided as one function of the system controller 80. That is, the system controller 80 executes the predetermined control program to function as the display control unit 118. As shown in FIG. 6, the display control unit 118 controls the driving of the display 130 through a display drive unit 142 to control the display on the display unit 110A of the shutter speed dial 110.

[Dial Plate Image]

Figure 9:
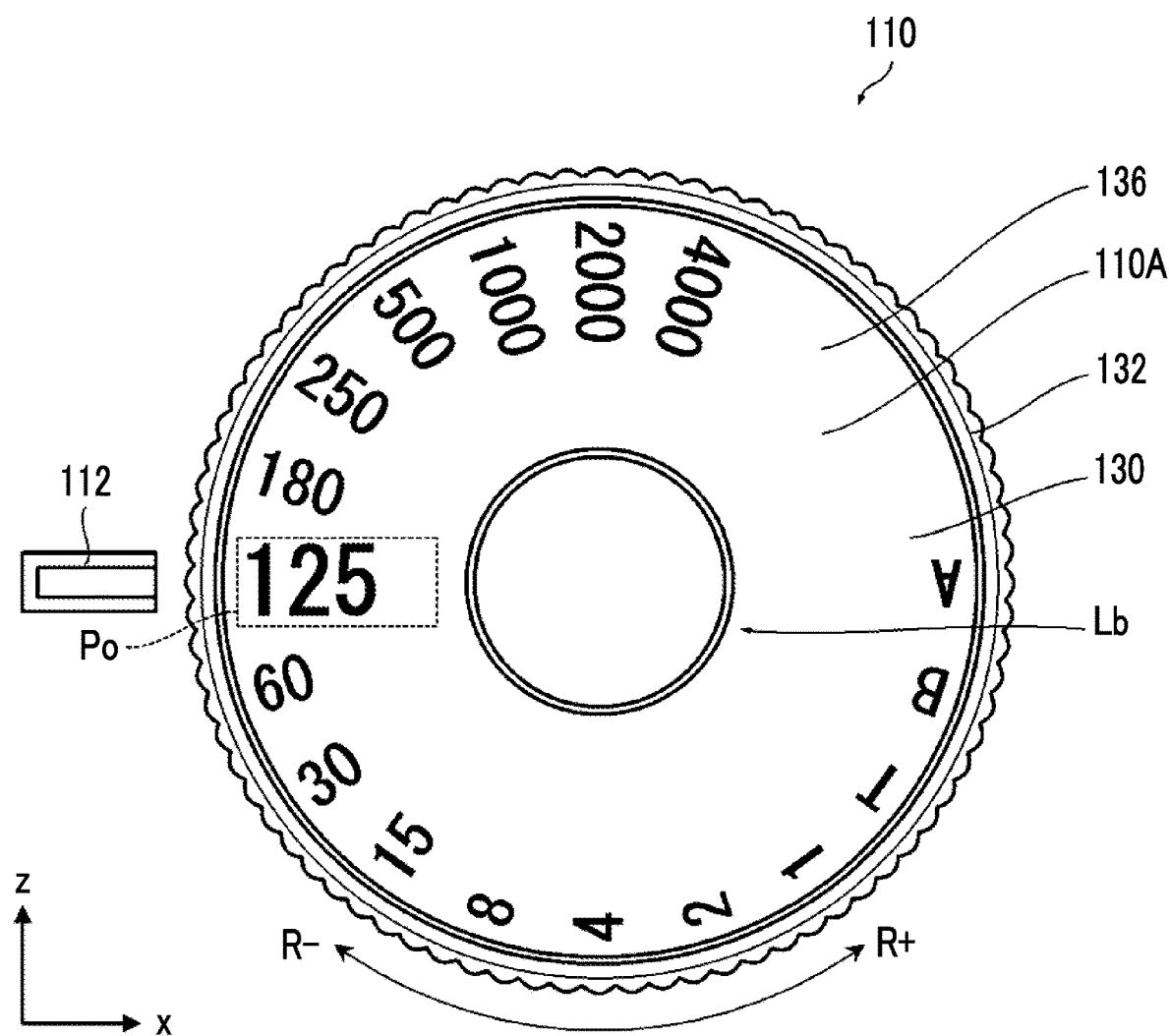
FIG. 9 is a plan view showing an example of a dial plate image displayed on the display unit of the shutter speed dial.

FIG. 9 is a plan view showing an example of a dial plate image displayed on the display unit 110A of the shutter speed dial 110.

As shown in FIG. 9, the dial plate image includes an image picture Lb of a lock release button and values of the settable shutter speeds.

(1) Lock Release Button

The lock release button is a button that releases the lock of the switching of the shutter speed. In a case where the lock release button is pressed, the lock is released. In a case where the lock release button is released, the lock is set. That is, the lock is released only while the lock release button is pressed.

In a case where the switching of the shutter speed is locked, it is impossible to switch the shutter speed. That is, even in a case where the shutter speed dial 110 is rotationally operated, the switching of the shutter speed is impossible while the switching is locked. Therefore, the switching of the shutter speed is possible only in a case where the shutter speed dial 110 is rotationally operated while the lock release button is pressed.

The touch sensor 136 detects that the lock release button is pressed. That is, the contact with the upper surface of the shutter speed dial 110 is detected by the touch sensor 136 to detect that the lock release button is pressed.

As shown in FIG. 9, the image picture Lb of the lock release button is displayed in the center of the display unit 110A. That is, the image picture Lb of the lock release button is displayed on the rotation center of the shutter speed dial 110. The image picture Lb of the lock release button is an image imitating an actual button. In the example shown in FIG. 9, an image imitating a circular button is set as the image picture Lb of the lock release button.

(2) Shutter Speed

The settable shutter speeds are displayed on the same circumference at regular intervals with the rotation center of the shutter speed dial 110 as the center. The display interval is the same as the setting interval of the click position. Therefore, for example, in a case where the setting interval of the click position is 36°, the settable shutter speeds are displayed at 36° interval.

The shutter speed displayed on the display unit 110A is displayed as a reciprocal number. That is, as shown in FIG. 8, 1 second, ½ second, ¼ second, ⅛ second, 1/15 second, 1/30 second, 1/60 second, 1/125 second, 1/180 second, 1/250 second, 1/500 second, 1/1000 second, 1/2000 second, and 1/4000 second are respectively displayed as 1, 2, 4, 8, 15, 30, 60, 125, 180, 250, 500, 1000, 2000, and 4000. Further, each mode of Auto, Bulb, and Time is simply displayed with initials as A, B, and T, respectively.

The sequence of the display of the shutter speed is the order of the switching. That is, the shutter speed is displayed in order of A, B, T, 1, 2, 4, 8, 15, 30, 60, 125, 180, 250, 500, 1000, 2000, and 4000.

Further, a direction in which the shutter speed is displayed is the clockwise direction (minus direction R−). That is, the shutter speed is displayed in order of A, B, T, 1, 2, 4, 8, 15, 30, 60, 125, 180, 250, 500, 1000, 2000, and 4000 along the clockwise direction (minus direction R−).

A display position is set such that a currently selected shutter speed is displayed at a current setting display position Po. The current setting display position Po is set at a position corresponding to the indicator 112. In the digital camera 1 of the embodiment, since the indicator 112 is positioned at the position corresponding to nine o'clock, the current setting display position Po is set at the position corresponding to nine o'clock. In the digital camera 1 of the embodiment, the setting displayed at the current setting display position Po and the selectable settings are displayed side by side on the same circumference. Accordingly, it is possible to easily grasp the selectable settings and thus to further improve the operability.

In FIG. 9, the current setting display position Po is indicated by a broken line. However, the broken line is indicated for convenience of the description and is not actually displayed on the display unit 110A.

In the example shown in FIG. 9, a case where the currently selected shutter speed is 1/125 second is displayed. In this case, as shown in FIG. 9, "125" indicating 1/125 second is displayed at the current setting display position Po.

A shutter speed displayed at the current setting display position Po is displayed relatively larger than other shutter speeds. That is, the currently selected shutter speed is displayed relatively larger character size than other shutter speeds. Accordingly, it is possible to clarify a value of the currently selected shutter speed. Moreover, it is possible to visually recognize the currently selected setting easily and thus to further improve the operability.

[Display Control of Dial Plate Image]

As described above, the display control unit 118 dynamically changes the display on the display unit 110A in response to the operation of the shutter speed dial 110. The display control unit 118 controls the display on the display unit 110A based on the outputs from the touch sensor 136 and the rotation detection unit 114.

(1) Case Where Lock is Released

In the case where the lock release button is pressed, the lock is released. The display form of the image picture Lb of the lock release button is switched in conjunction with the lock release. The display control unit 118 controls the display on the display unit 110A to switch the display form of the image picture Lb of the lock release button based on the output from the touch sensor 136.

Figure 10A:
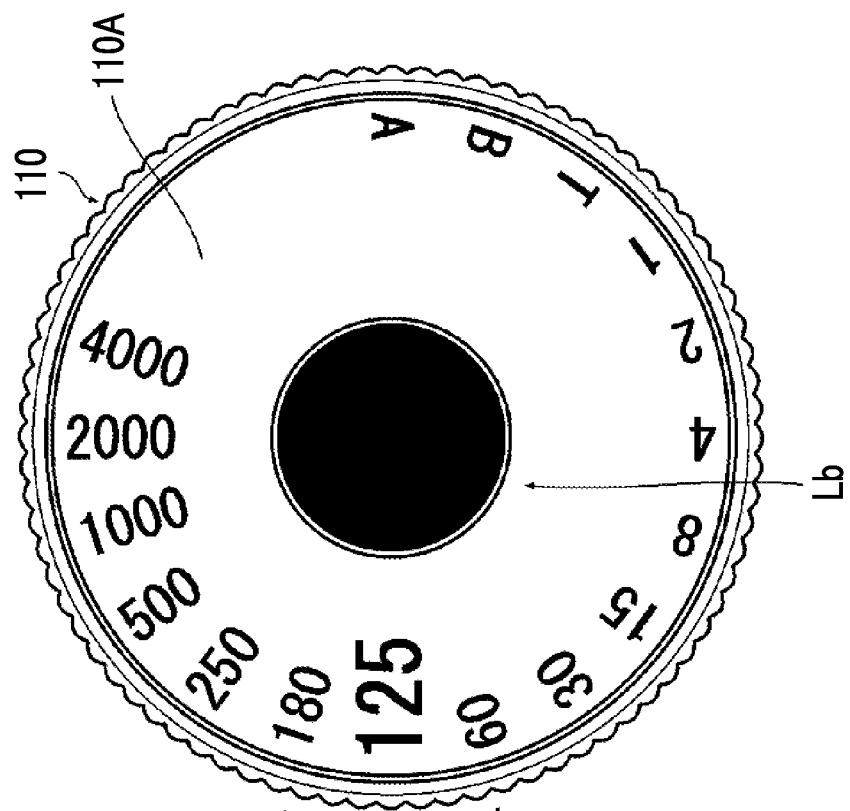
FIGS. 10A and 10B are transition diagrams of displays of dial plate images in a case where a lock is set and in a case where the lock is released.
Figure 10B:
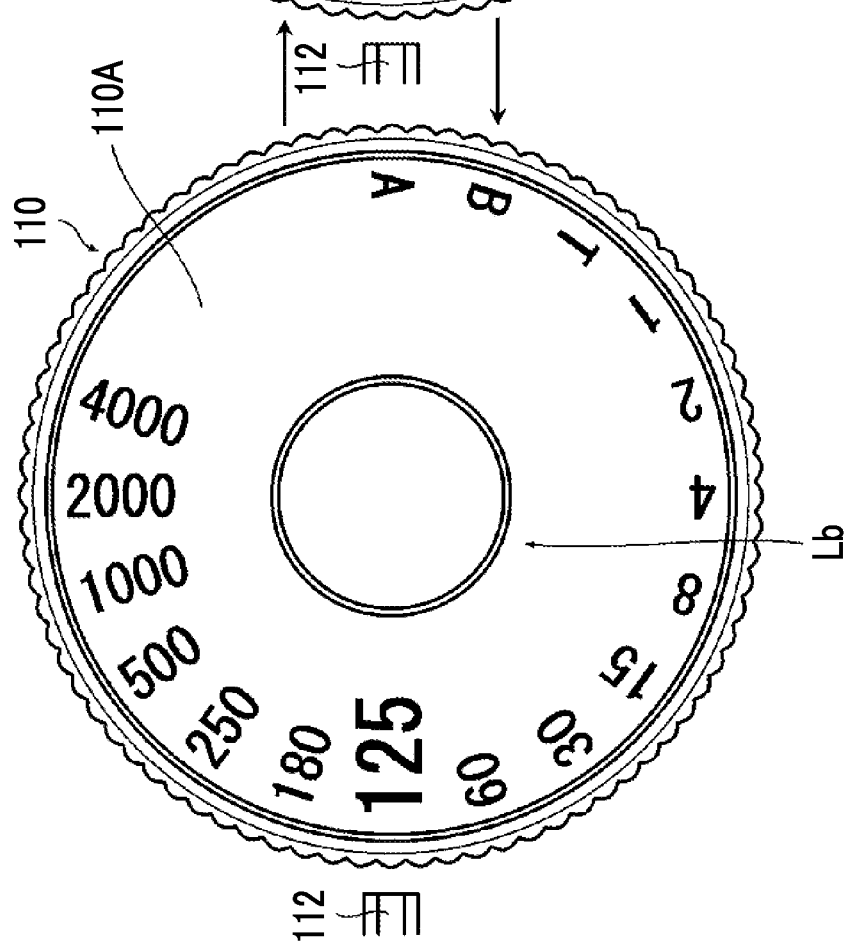

FIGS. 10A and 10B are transition diagrams of displays of dial plate images in the case where the lock is set and in the case where the lock is released. FIG. 10A shows a display example of the dial plate image in the case where the lock is set, and FIG. 10B shows a display example of the dial plate image in the case where the lock is released.

In the digital camera 1 of the embodiment, a display color of the image picture Lb of the lock release button is switched between at the time of the lock and at the time of the lock release. Specifically, the display color is inverted.

In the case where the lock is set as shown in FIG. 10A, the image picture Lb of the lock release button is displayed in white. That is, the inner side of a frame line indicating the outline of the lock release button is displayed in white.

On the other hand, in the case where the lock is released as shown in FIG. 10B, the inner side of the frame line indicating the outline of the lock release button is displayed in black in the image picture Lb of the lock release button.

In this manner, the display form of the image picture Lb of the lock release button can be switched between the case where the lock is set and the case where the lock is released. Accordingly, it is possible to grasp at a glance whether the lock is currently set.

(2) Case Where Shutter Speed Dial is Rotationally Operated

In the case where the shutter speed dial 110 is rotationally operated while the lock release button is pressed, the shutter speed can be switched. The dial plate image can also be switched in conjunction with the switching of the shutter speed.

The display of the dial plate image can be switched so as to rotate in conjunction with the rotation of the shutter speed dial 110. That is, the display of the dial plate image is controlled so as to rotate by the amount of the operation in a direction where the shutter speed dial 110 is operated. The display control unit 118 controls the display on the display unit 110A to control the display of the dial plate image based on the outputs from the touch sensor 136 and the rotation detection unit 114.

FIGS. 11A and 11B are transition diagrams of displays of dial plate images in response to a rotation operation of the shutter speed dial.

FIG. 11B shows a display state of the display unit 110A in a case where the shutter speed dial is rotated by five clicks in the plus direction R+ from a state shown in FIG. 11A. Further, FIG. 11A shows a display state of the display unit 110A in a case where the shutter speed dial is rotated by five clicks in the minus direction R− from the state shown in FIG. 11B.

It is assumed that the shutter speed is set to 1/125 second. In this case, as shown in FIG. 11A, "125" indicating 1/125 second is displayed at the current setting display position Po.

In a case where the shutter speed dial 110 is rotated by five clicks in the plus direction R+ while the lock release button is pressed from the state where the shutter speed is set to 1/125 second, the shutter speed is advanced by five stages and is set to 1/2000 second (refer to FIG. 8). As a result, as shown in FIG. 11B, "2000" indicating 1/2000 second is displayed at the current setting display position Po.

Further, in a case where the shutter speed dial 110 is rotated by five clicks in the minus direction R− while the lock release button is pressed from the state where the shutter speed is set to 1/2000 second, the shutter speed is lowered by five stages and is set to 1/125 second (refer to FIG. 8). As a result, as shown in FIG. 11A, "125" is displayed at the current setting display position Po.

The display control unit 118 rotates the dial plate image based on the output from the rotation detection unit 114. That is, the dial plate image is rotated based on the rotation direction and the rotation amount of the shutter speed dial 110. For example, in a case where the shutter speed dial 110 is rotationally operated in the plus direction R+, the dial plate image is rotated in the plus direction R+. At this case, the dial plate image is rotated with the rotation axis of the shutter speed dial 110 as the center. In the digital camera 1 of the embodiment, since the image picture Lb of the lock release button is displayed as the circle and at the center of the display unit 110A, the image picture Lb of the lock release button is not changed even in the case where the dial plate image is rotated. Therefore, in the case where the dial plate image is rotated, only the display of the shutter speed is changed. The dial plate image is rotated by the same amount in the same direction in conjunction with the rotation of the shutter speed dial 110. Accordingly, it is possible to operate the shutter speed dial 110 with the same operation feeling as the operation feeling of the former shutter speed dial, that is, the shutter speed dial of which the shutter speeds are printed on the dial plate.

«Action of Shutter Speed Setting Device (Setting Method of Shutter Speed)»

<Setting Processing of Shutter Speed>

Figure 12:
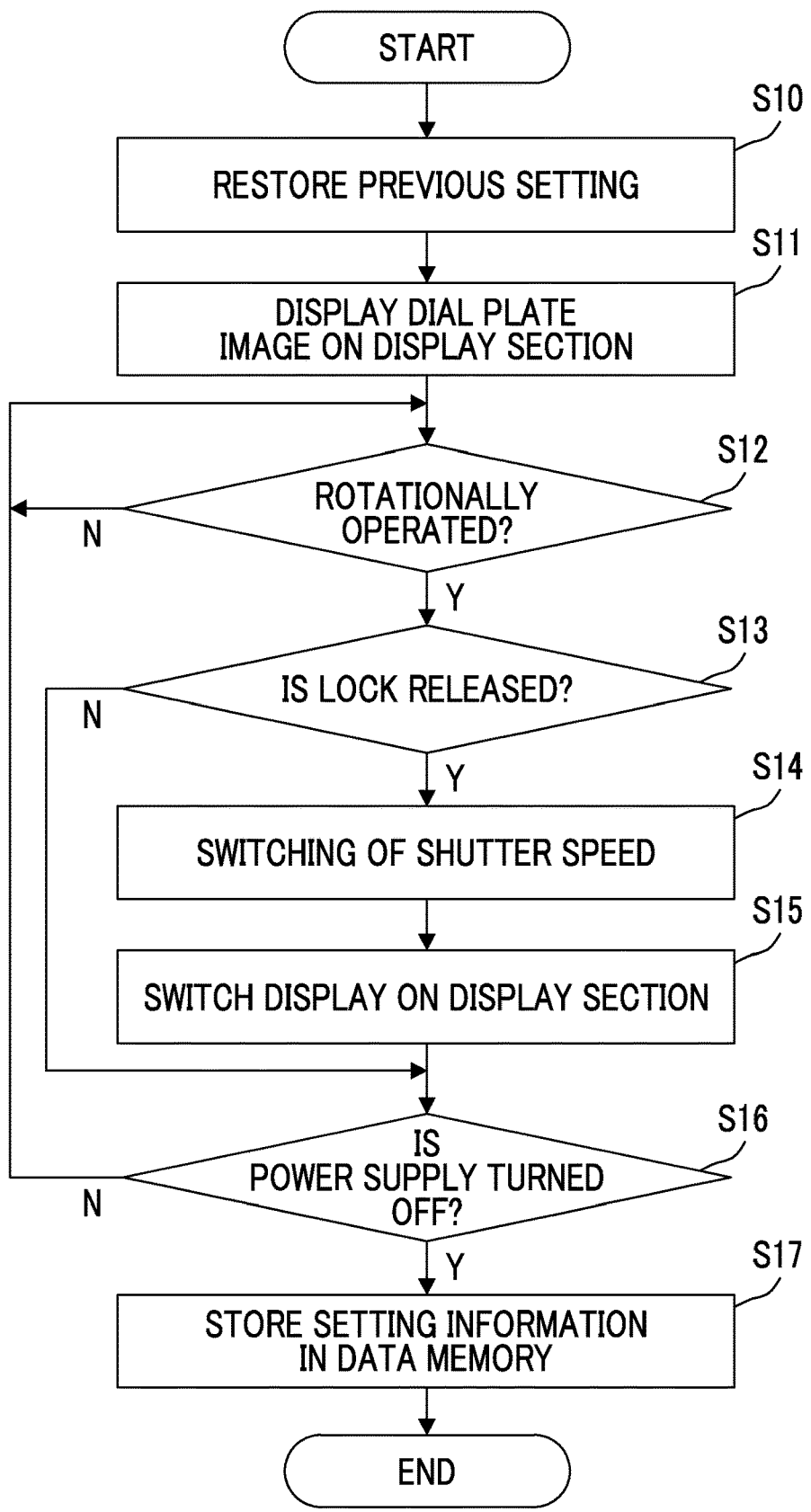
FIG. 12 is a flowchart showing a procedure of setting processing of the shutter speed by the shutter speed setting device.

FIG. 12 is a flowchart showing a procedure of setting processing of the shutter speed by the shutter speed setting device.

In a case where the power supply of the digital camera 1 is turned on, a previous setting is restored (step S10). That is, a shutter speed set at the time of power supply off is set. The setting switching unit 116 reads the previous setting from the data memory 64 and sets a shutter speed to the shutter speed set at the time of power supply off.

In a case where the shutter speed is set, image data of the dial plate image is generated based on the set shutter speed, and the generated image data is displayed on the display unit 110A (step S11). For example, in a case where the set shutter speed is 1/125 second, the image data of the dial plate image is generated such that "125" indicating 1/125 second is displayed at the current setting display position Po, and the generated image data is displayed on the display unit 110A as shown in FIG. 9.

Then, the presence or absence of the operation of the shutter speed dial 110 is determined (step S12). In a case where the shutter speed dial 110 is rotationally operated, it is determined whether the lock is released (step S13). That is, it is determined whether the lock release button is pressed. Whether the lock release button is pressed is determined based on the output of the touch sensor 136. In a case where the contact with the upper surface of the shutter speed dial 110 is detected by the touch sensor 136, the lock release button is decided to be pressed and it is determined that the lock is released. That is, the switching of the setting by the shutter speed dial 110 is determined to be valid. On the other hand, in a case where the contact with the upper surface of the shutter speed dial 110 is not detected by the touch sensor 136, the lock release button is decided not to be pressed and it is determined that the lock is set. That is, the switching of the setting by the shutter speed dial 110 is determined to be invalid.

In a case where the lock is released, that is, in a case where the switching of the setting by the shutter speed dial 110 is valid, the shutter speed can be switched in response to the rotation operation of the shutter speed dial 110. In this case, the shutter speed can be switched based on the operated rotation direction and rotation amount (the number of clicks) (step S14). Further, the display on the display unit 110A can be switched based on the operated rotation direction and rotation amount (step S15). That is, the dial plate image is rotationally displayed based on the operated rotation direction and rotation amount.

On the other hand, in a case where the lock is not released, that is, in the case where the switching of the setting by the shutter speed dial 110 is invalid, the switching of the shutter speed cannot be performed. In this case, since the shutter speed dial 110 is rotationally operated while the lock release button is not pressed, the operation cannot be accepted and the current setting is maintained. Further, the current display on the display unit 110A is also maintained.

Then, it is determined whether the power supply is turned off (step S16). In a case where the power supply is turned off, the current setting is stored in the data memory 64 (step S17), and the processing ends.

<Processing of Lock/Lock Release>

Figure 13:
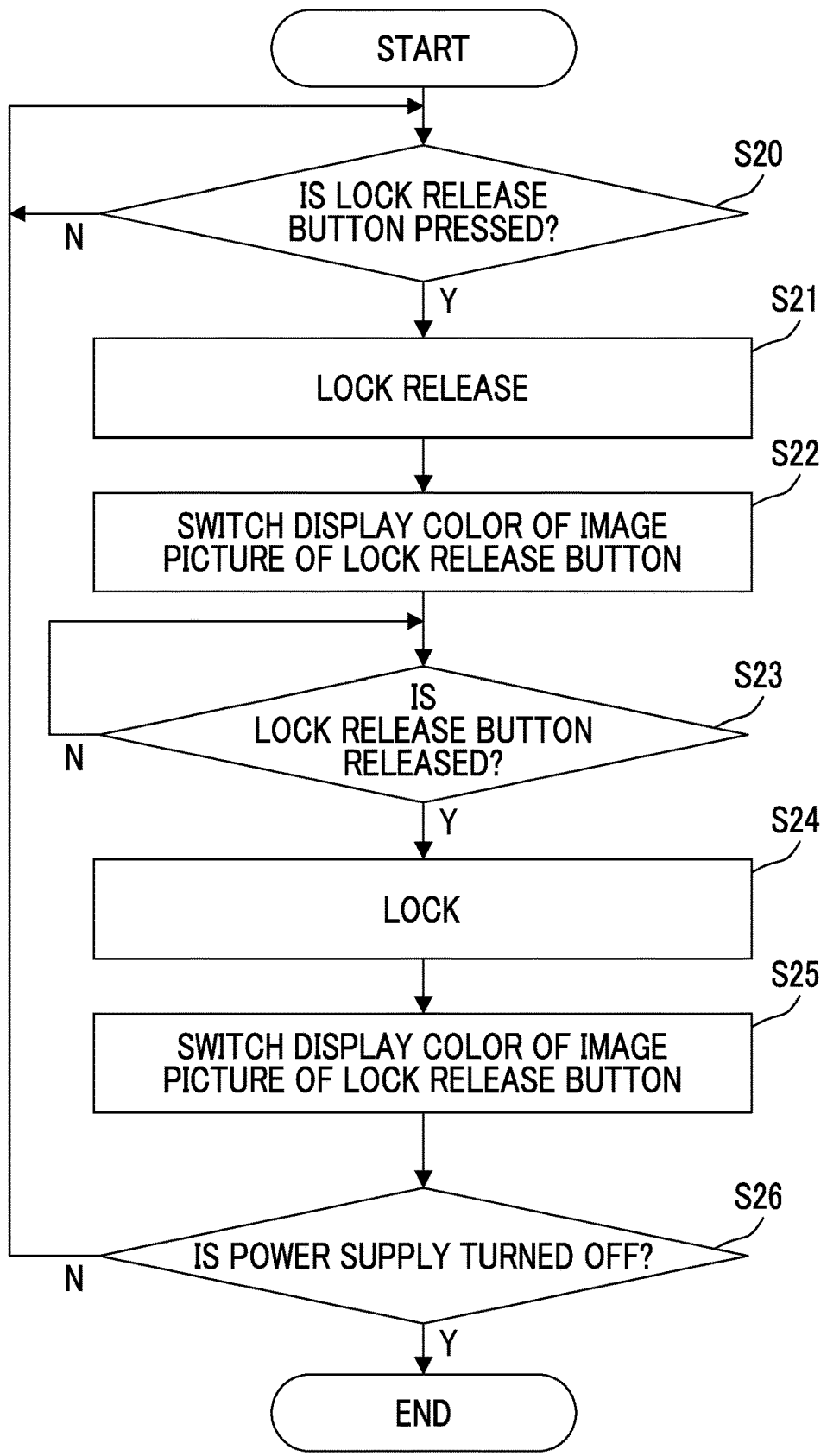
FIG. 13 is a flowchart showing a processing procedure of lock/lock release.

FIG. 13 is a flowchart showing a processing procedure of lock/lock release.

It is determined whether the lock release button is pressed (step S20). That is, the presence or absence of the contact of the finger on the upper surface of the shutter speed dial 110 which is the operation dial is determined. Whether the lock release button is pressed is determined based on the output of the touch sensor 136. In the case where the contact with the upper surface of the shutter speed dial 110 is detected by the touch sensor 136, it is determined that the lock release button is pressed.

In a case where the lock release button is pressed, the lock is released (step S21). That is, the switching of the setting by the shutter speed dial 110 which is the operation dial becomes valid. Accordingly, the switching of the shutter speed by the shutter speed dial 110 becomes possible.

In a case where the lock is released, the display form of the image picture Lb of the lock release button can be switched (step S22). That is, the display color is inverted.

Then, it is determined whether the finger is released from the lock release button (step S23). Whether the finger is released from the lock release button is determined based on the output of the touch sensor 136. In a case where the contact with the upper surface of the shutter speed dial 110 is no longer detected by the touch sensor 136, it is determined that the finger is released from the lock release button.

In a case where the finger is released from the lock release button, the switching of the shutter speed is locked (step S24). Accordingly, the switching of the shutter speed by the shutter speed dial 110 becomes impossible.

In a case where the switching of the shutter speed is locked, the display form of the image picture Lb of the lock release button can be switched (step S25). That is, the display color is inverted.

Then, it is determined whether the power supply is turned off (step S26). In a case where the power supply is turned off, the processing ends.

In this manner, in the case where the lock release button is pressed, the lock of the switching of the shutter speed is released. In the case where the lock release button is released, the lock of the switching of the shutter speed is locked again. That is, the lock is released only while the lock release button is pressed. The presence or absence of the contact of the finger on the upper surface of the shutter speed dial 110 is determined, but the invention is not limited thereto. The presence or absence of the contact of the palm, a touch pen, or the like may be determined.

According to the shutter speed setting device 100 of the embodiment as described above, the rotation operation of the shutter speed dial 110 can be valid only while the lock release button is pressed. That is, the shutter speed can be switched only in the case where the shutter speed dial 110 is rotationally operated while the lock release button is pressed. Accordingly, it is possible to effectively prevent an erroneous operation.

Further, since the presence or absence of the contact with the upper surface of the shutter speed dial 110 is determined and the lock is electronically performed, it is possible to simplify a structure of the shutter speed dial 110. In particular, a structure that is simple as a whole and hard to break can be achieved in combination with the digitization of the display section on the upper surface of the shutter speed dial 110. Moreover, since the touch sensor 136 detects the contact with the rotation center of the shutter speed dial 110, it is possible to effectively prevent the setting from unintentionally being changed. That is, since the operation becomes valid only in a case where the operation is performed while a rotation center portion of the shutter speed dial 110 is touched, it is possible to effectively prevent the erroneous operation. Further, since a region where the contact is detected is the rotation center portion of the shutter speed dial 110, it is possible to ensure better operability. That is, other positions cannot be searched by groping, but the position of the rotation center can be found even by groping. Therefore, in a case where the operation is performed in a dark environment, in a case where the operation is performed while a finder is viewed, or the like, it is possible to ensure especially better operability.

Furthermore, since the image picture Lb of the lock release button is displayed on the display unit 110A, the operation can be intuitively performed and thus even for a user who uses the shutter speed dial for the first time can use the dial without being confused.

Modification Example

<Other Setting Devices>

In the above-described embodiment, the case where the invention is applied to the setting device of the shutter speed is described, but the application of the invention is not limited thereto.

(1) Setting Device of Sensitivity

Figure 14:
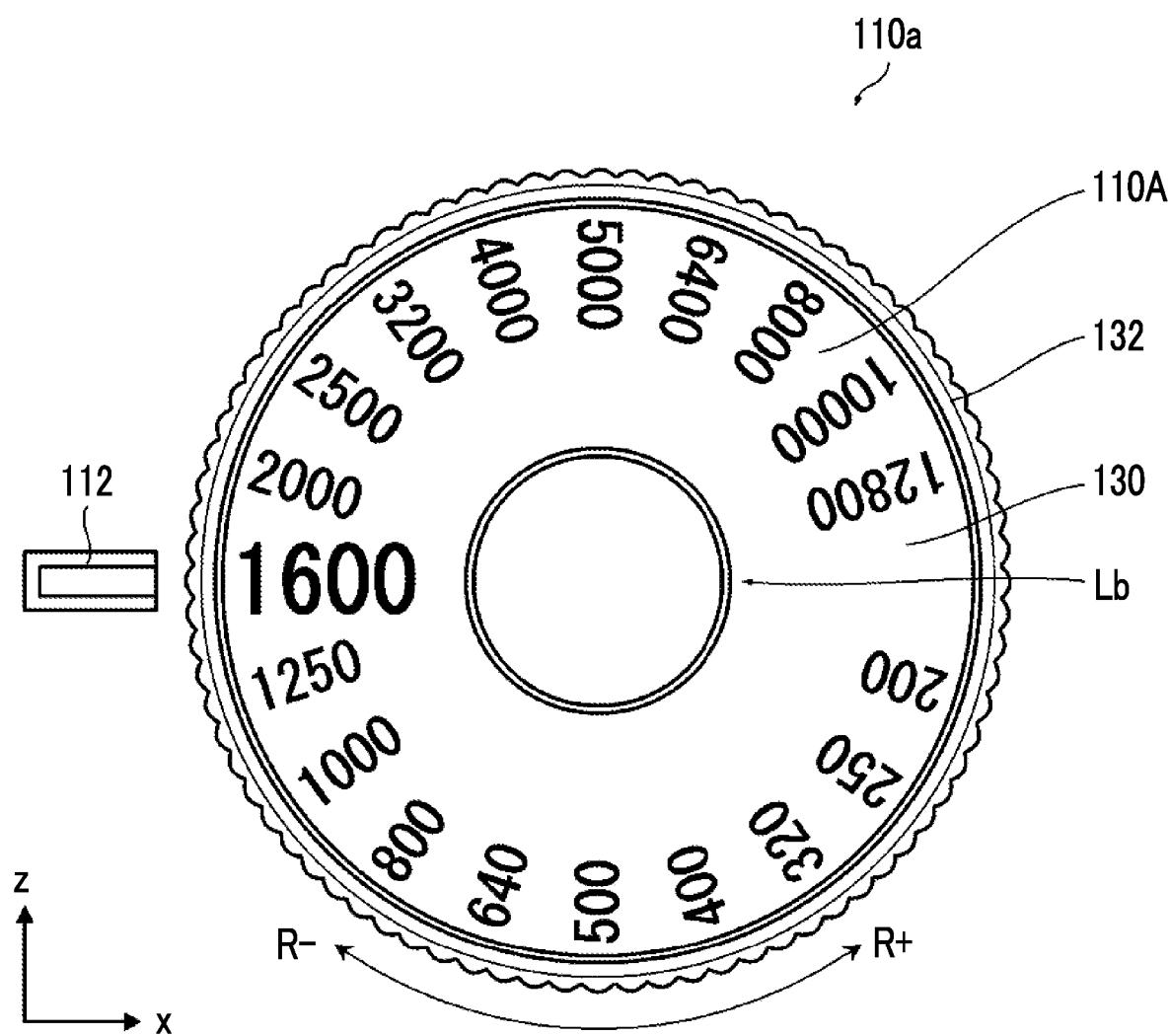
FIG. 14 is a plan view showing a display example of a dial plate image in a case where the invention is applied to the setting device of sensitivity.

FIG. 14 is a plan view showing a display example of a dial plate image in a case where the invention is applied to the setting device of sensitivity.

In a case where of being applied to the setting device of the sensitivity, a dial plate image for sensitivity is displayed on the display unit 110A of a sensitivity dial 110a which is the operation dial. The dial plate image for sensitivity displays the image picture Lb of the lock release button and values of the sensitivity which is a setting item.

FIG. 14 shows a display example of the dial plate image in a case where international organization for standardization sensitivity (ISO) is set with a step width of ⅓ stage from ISO200 to ISO12800. In this case, ISO sensitivity can be set by selecting any of ISO200, ISO250, ISO320, ISO400, ISO500, ISO640, ISO800, ISO1000, ISO1250, ISO1600, ISO2000, ISO2500, ISO3200, ISO4000, ISO5000, ISO6400, ISO8000, ISO10000, or ISO12800.

In the case of being applied to the setting device of sensitivity as shown in FIG. 14, the image picture Lb of the lock release button is also displayed at the center of the dial plate image (=rotation center of dial).

Figure 15B:
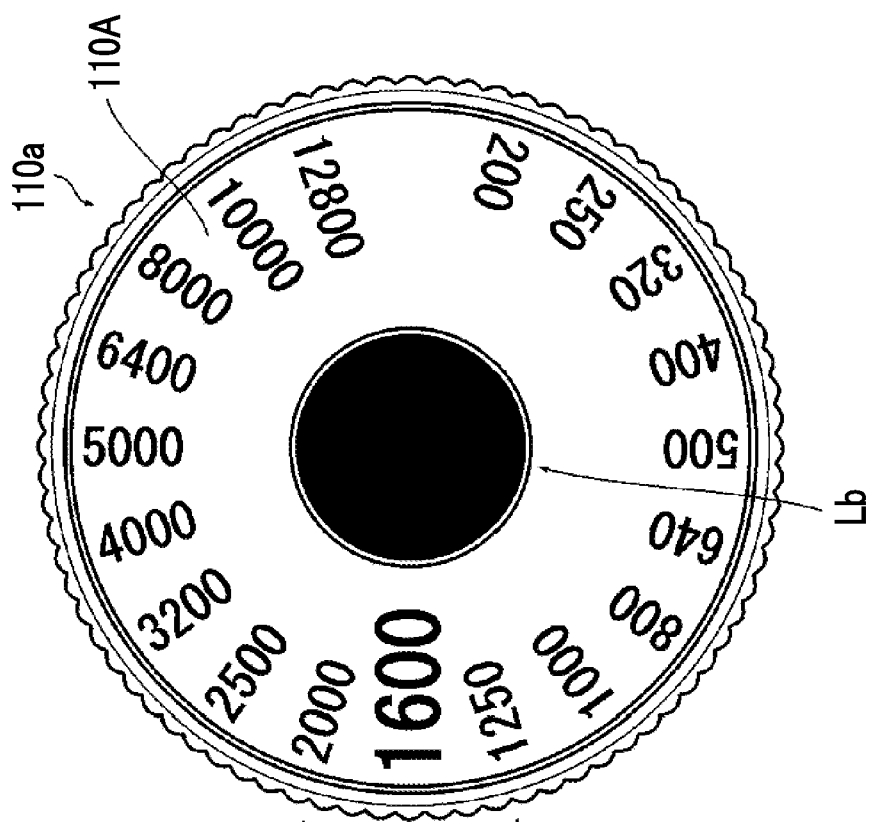
FIGS. 15A and 15B are transition diagrams of displays of dial plate images in the case where the lock is set and in the case where the lock is released.
Figure 15A:
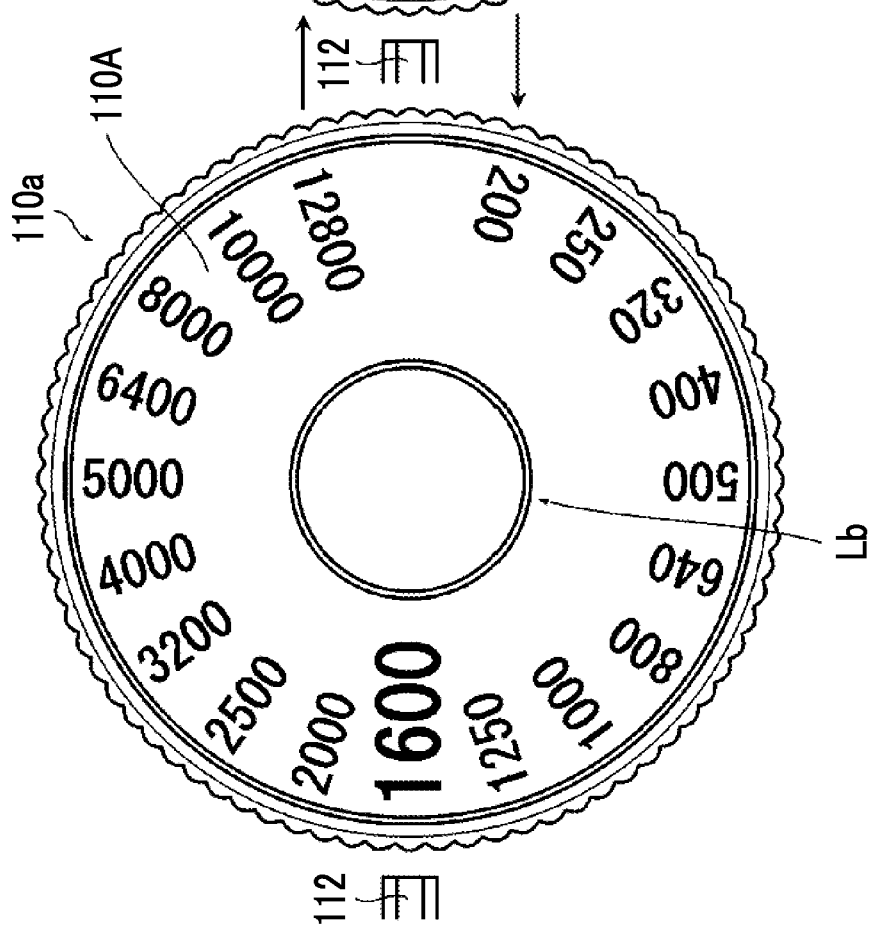

FIGS. 15A and 15B are transition diagrams of displays of dial plate images in the case where the lock is set and in the case where the lock is released. FIG. 15A shows a display example of the dial plate image in the case where the lock is set, and FIG. 15B shows a display example of the dial plate image in the case where the lock is released.

In the digital camera 1 of the embodiment, the display color of the image picture Lb of the lock release button is inverted between at the time of the lock and at the time of the lock release.

In the case where the lock is set as shown in FIG. 15A, the image picture Lb of the lock release button is displayed in white. That is, the inner side of the frame line indicating the outline of the lock release button is displayed in white.

On the other hand, in the case where the lock is released as shown in FIG. 15B, the inner side of the frame line indicating the outline of the lock release button is displayed in black in the image picture Lb of the lock release button.

(2) Setting Device of Exposure Correction Value

Figure 16:
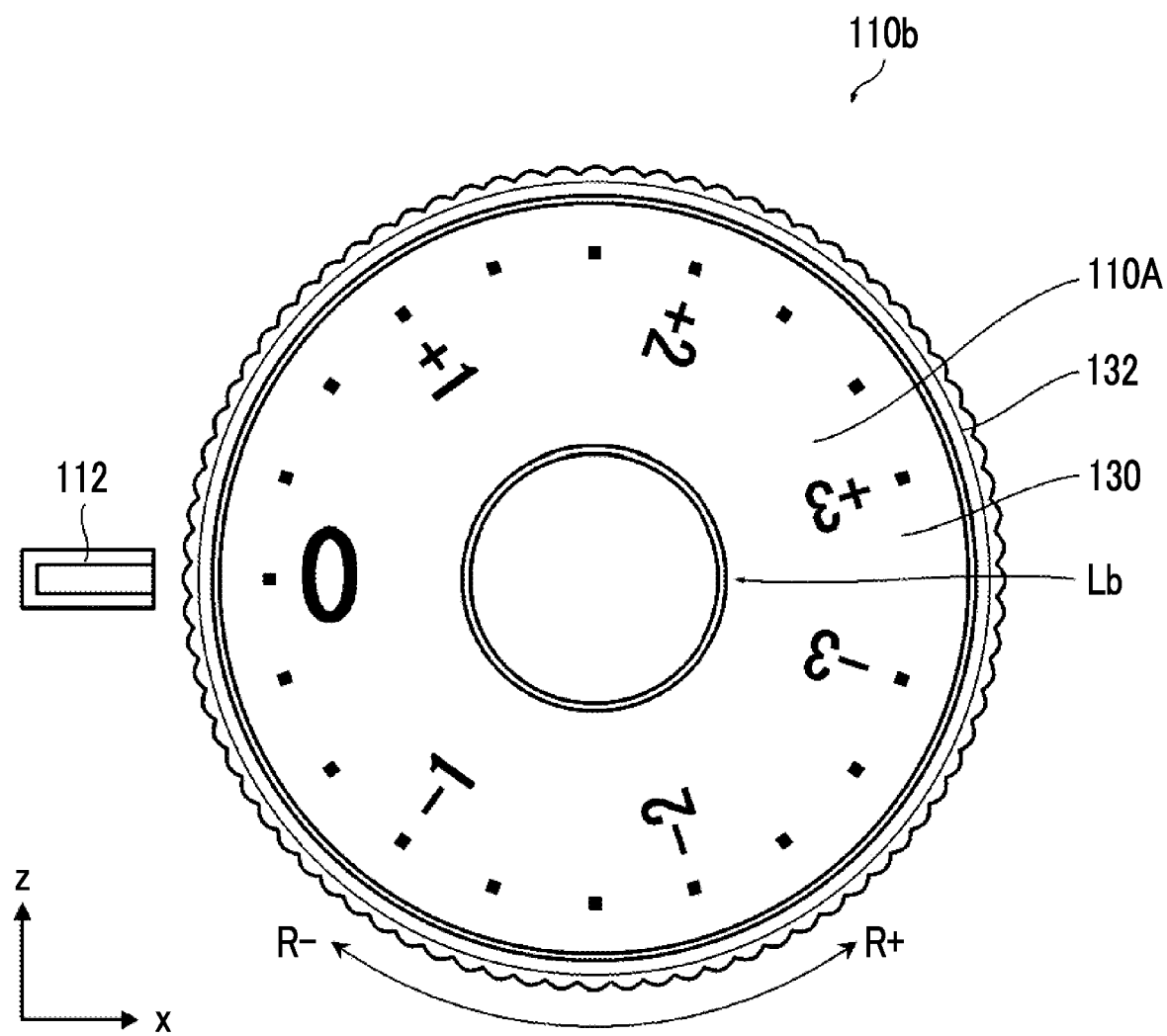
FIG. 16 is a plan view showing a display example of a dial plate image in a case where the invention is applied to the setting device of an exposure correction value.

FIG. 16 is a plan view showing a display example of a dial plate image in a case where the invention is applied to the setting device of an exposure correction value.

In the case of being applied to the setting device of the exposure correction value, a dial plate image for exposure correction is displayed on the display unit 110A of an exposure correction dial 110b which is the operation dial. The dial plate image for exposure correction includes the image picture Lb of the lock release button and exposure correction values which are the setting item.

FIG. 16 displays the display example of the dial plate image in a case where the exposure correction value is set with the step width of ⅓ stage from −3 to +3. In this case, the exposure correction value can be set by selecting any of −3, −2·⅔, −2·⅓, −2, −1·⅔, −1·⅓, −1, −⅔, −⅓, 0, +⅓, +⅔, +1, +1·⅓, +1·⅔, +2, +2·⅓, +2·⅔, or +3. The settable exposure correction values between −3 and −2, between −2 and −1, between −1 and 0, between 0 and +1, between +1 and +2, and between +2 and +3 are respectively displayed by dots.

In the case of being applied to the setting device of the exposure correction value as shown in FIG. 16, the image picture Lb of the lock release button is also displayed at the center of the dial plate image (=rotation center of dial).

Figure 17A:
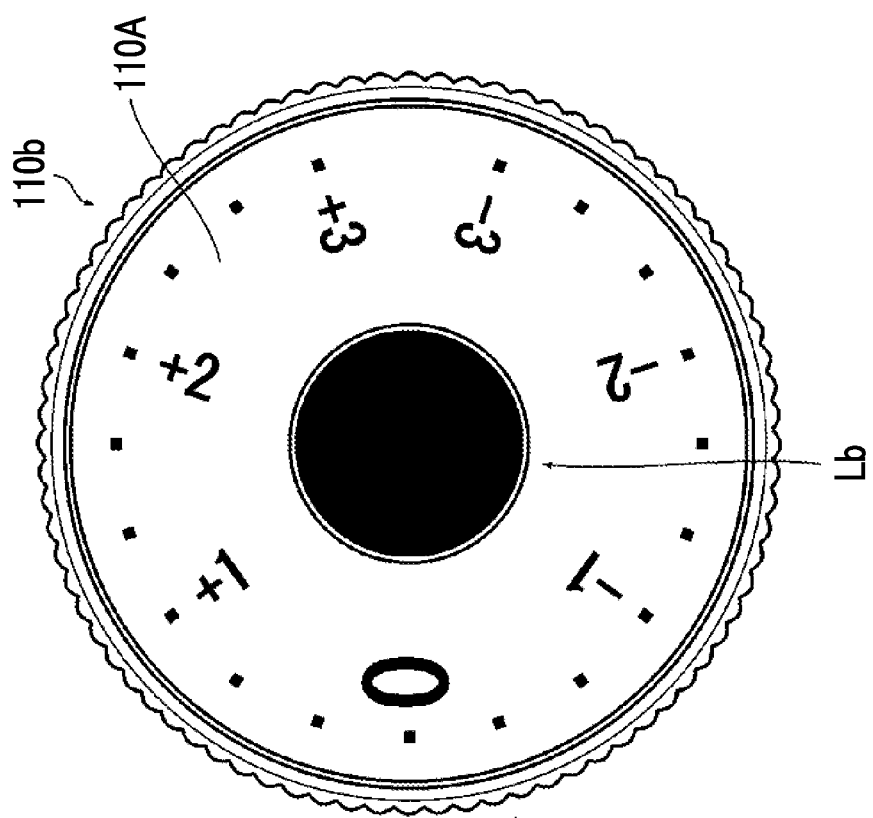
FIGS. 17A and 17B are transition diagrams of displays of dial plate images in the case where the lock is set and in the case where the lock is released.
Figure 17B:
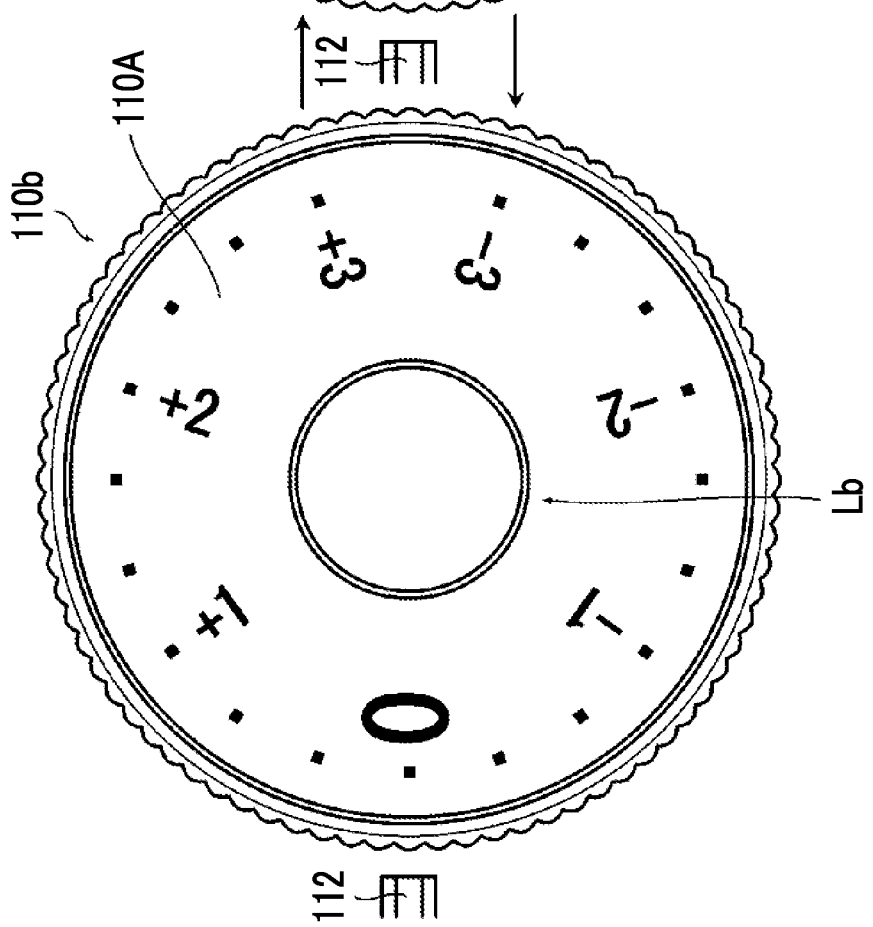

FIGS. 17A and 17B are transition diagrams of displays of dial plate images in the case where the lock is set and in the case where the lock is released. FIG. 17A shows a display example of the dial plate image in the case where the lock is set, and FIG. 17B shows a display example of the dial plate image in the case where the lock is released.

In the digital camera 1 of the embodiment, the display color of the image picture Lb of the lock release button is inverted between at the time of the lock and at the time of the lock release.

In the case where the lock is set as shown in FIG. 17A, the image picture Lb of the lock release button is displayed in white. That is, the inner side of the frame line indicating the outline of the lock release button is displayed in white.

On the other hand, in the case where the lock is released as shown in FIG. 17B, the inner side of the frame line indicating the outline of the lock release button is displayed in black in the image picture Lb of the lock release button.

(3) Setting Device of Imaging Mode

Figure 18:
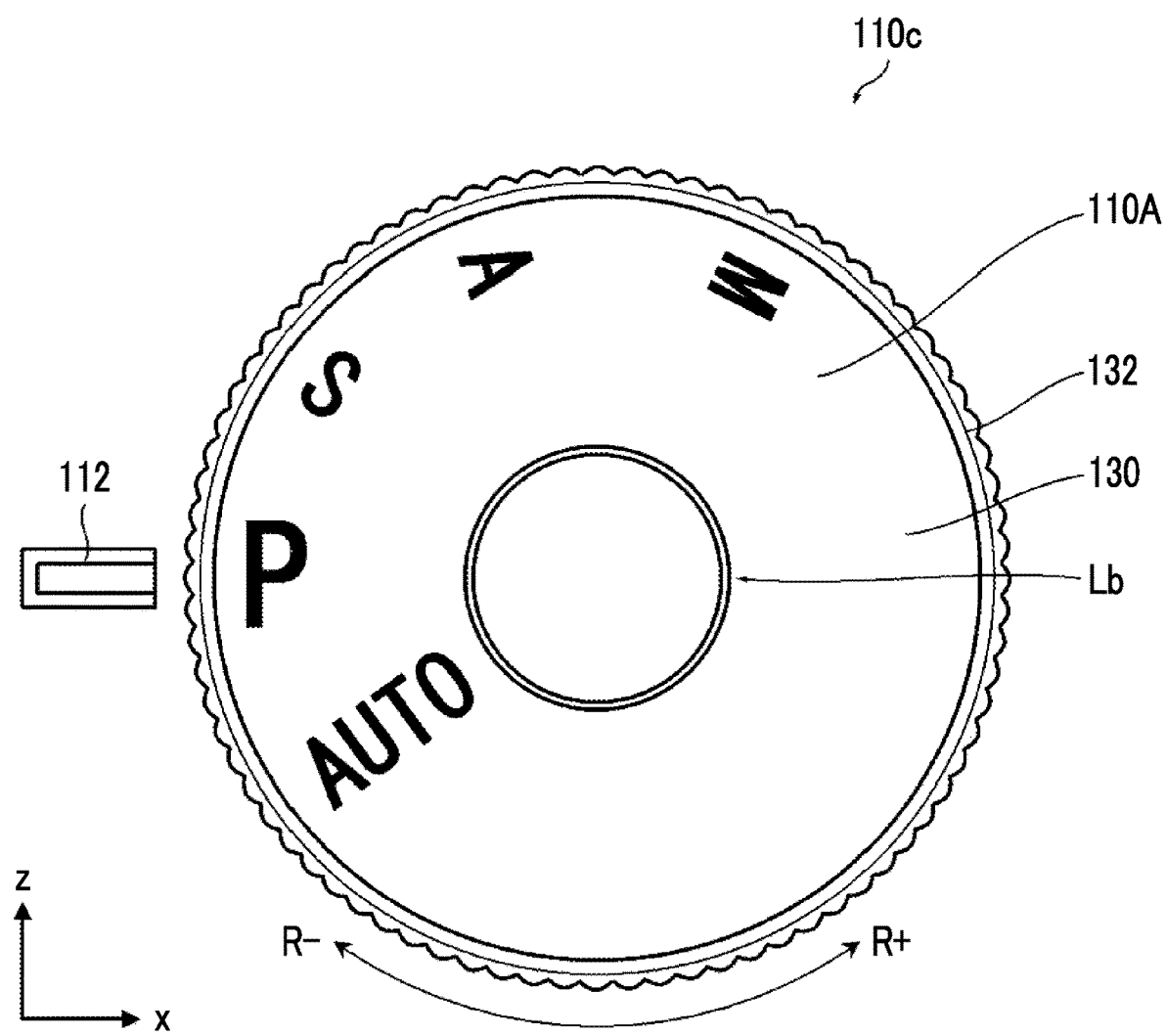
FIG. 18 is a plan view showing a display example of a dial plate image in a case where the invention is applied to the setting device of an imaging mode.

FIG. 18 is a plan view showing a display example of a dial plate image in a case where the invention is applied to the setting device of the imaging mode.

In the case of being applied to the setting device of the imaging mode, a dial plate image for imaging mode selection is displayed on the display unit 110A of a mode dial 110c which is the operation dial. The dial plate image for imaging mode selection includes the image picture Lb of the lock release button and symbols of the imaging mode which is a selection item.

FIG. 18 shows the display example of the dial plate image in a case where auto, program, shutter speed priority, aperture stop priority, and manual are prepared as the selectable imaging modes.

Here, the auto refers to a mode in which the camera automatically decides an F-number and a shutter speed such that the proper exposure is achieved. The auto is displayed as "AUTO" on the display unit 110A.

Further, the program refers to a mode in which an imaging person can change a combination of the F-number and the shutter speed while the exposure is constantly maintained. The mode is an imaging mode in which so-called program shift is possible. The program is displayed as "P" on the display unit 110A.

The shutter speed priority refers to a mode in which the camera automatically decides an F-number such that the proper exposure is achieved for a shutter speed selected by the user. The shutter speed priority is displayed as "S" on the display unit 110A.

The aperture stop priority refers to a mode in which the camera automatically decides a shutter speed such that the proper exposure is achieved for an F number selected by the user. The aperture stop priority is displayed as "A" on the display unit 110A.

The manual refers to a mode in which the user selects the shutter speed and the F-number. The manual is displayed as "M" on the display unit 110A.

In a case where the mode dial 110c is rotated in the plus direction R+, the imaging mode is switched in order of auto (AUTO), program (P), shutter speed priority (S), aperture stop priority (A), and manual (M) for each one click.

As shown in FIG. 18, in the case of being applied to the setting device of the imaging mode, the image picture Lb of the lock release button is also displayed in the center portion on the display unit 110A of the mode dial 110c.

Figure 19B:
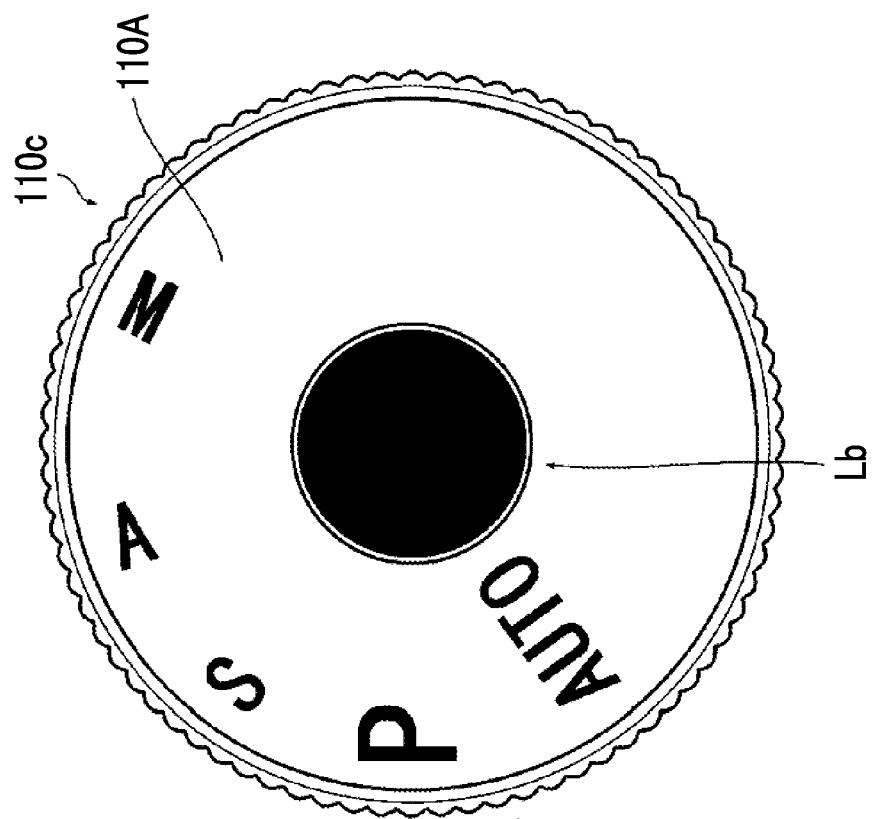
FIGS. 19A and 19B are transition diagrams of displays of dial plate images in the case where the lock is set and in the case where the lock is released.
Figure 19A:
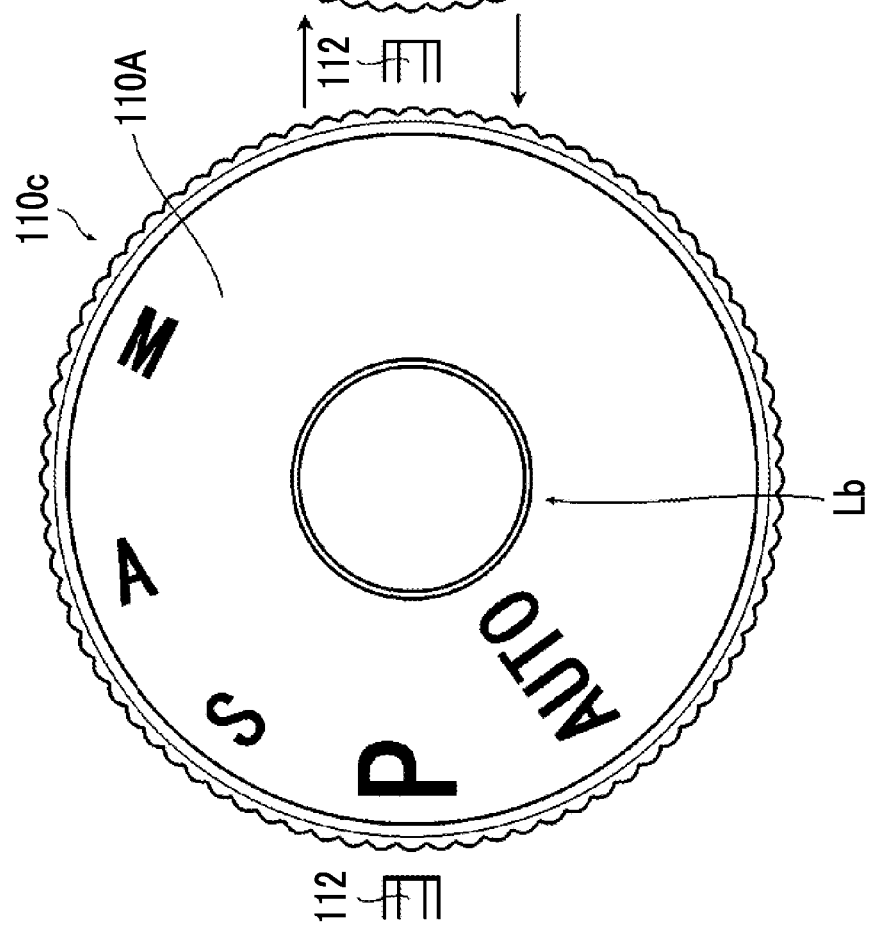

FIGS. 19A and 19B are transition diagrams of displays of dial plate images in the case where the lock is set and in the case where the lock is released. FIG. 19A shows a display example of the dial plate image in the case where the lock is set, and FIG. 19B shows a display example of the dial plate image in the case where the lock is released.

In the digital camera 1 of the embodiment, the display color of the image picture Lb of the lock release button is inverted between the case where the lock is set and the case where the lock is released.

In the case where the lock is set as shown in FIG. 19A, the image picture Lb of the lock release button is displayed in white. That is, the inner side of the frame line indicating the outline of the lock release button is displayed in white.

On the other hand, in the case where the lock is released as shown in FIG. 19B, the inner side of the frame line indicating the outline of the lock release button is displayed in black in the image picture Lb of the lock release button.

In this manner, the invention can be applied to various setting devices by using rotary operation dials. In addition, for example, the invention can be applied to a setting device that sets volume by using the rotary operation dial or the like.

The user may select the functions to be assigned to the operation dial. For example, the user may select the function as the shutter speed dial, the function as the sensitivity dial, and the function as the exposure correction dial. In this case, the selection of the functions to be assigned to the operation dial is performed by the menu screen or the like. Alternatively, a dedicated switching button may be provided, and an assigned function may be switched every time the button is pressed.

<Modification Example of Contact Detection Unit>

In the above-described embodiment, the contact detection unit is formed of the touch sensor, but the configuration of the contact detection unit is not limited thereto.

Further, in the above-described embodiment, the entire region on the upper surface of the operation dial is set as the detection region of the contact, but contact with a part of the upper surface of the operation dial may also be detected. In this case, it is preferable to detect the contact with the rotation center of the operation dial. That is, since the operation is valid only in a case where the operation is performed while the contact with the center portion thereof is maintained, it is possible to effectively prevent the erroneous operation. Further, since the region where the contact is detected is the center portion of the operation dial, it is also possible to ensure better operability. That is, other positions cannot be searched by groping, but the position of the rotation center can be found even by groping. Therefore, in a case where the operation is performed in a dark environment, in a case where the operation is performed while a view finder is viewed, or the like, it is possible to ensure especially better operability.

In the case where the contact with the rotation center of the operation dial is detected, it is preferable to detect the contact with the display section of the image picture Lb of the lock release button. That is, the display section of the image picture Lb of the lock release button coincides with the detection region of the contact. Accordingly, in a case where a portion of the image picture Lb of the lock release button is touched, it is possible to firmly switch between a locked state and the lock release state, and thus to realize a stable operation. That is, the switching of the setting can be valid only in a case where the operation is performed while the image picture Lb of the lock release button is touched, and thus it is possible to prevent the erroneous operation. Further, even in the case where the operation is performed in the dark environment, in the case where the operation is performed while the view finder is viewed, or the like, the operation can be firmly performed.

Figure 20:
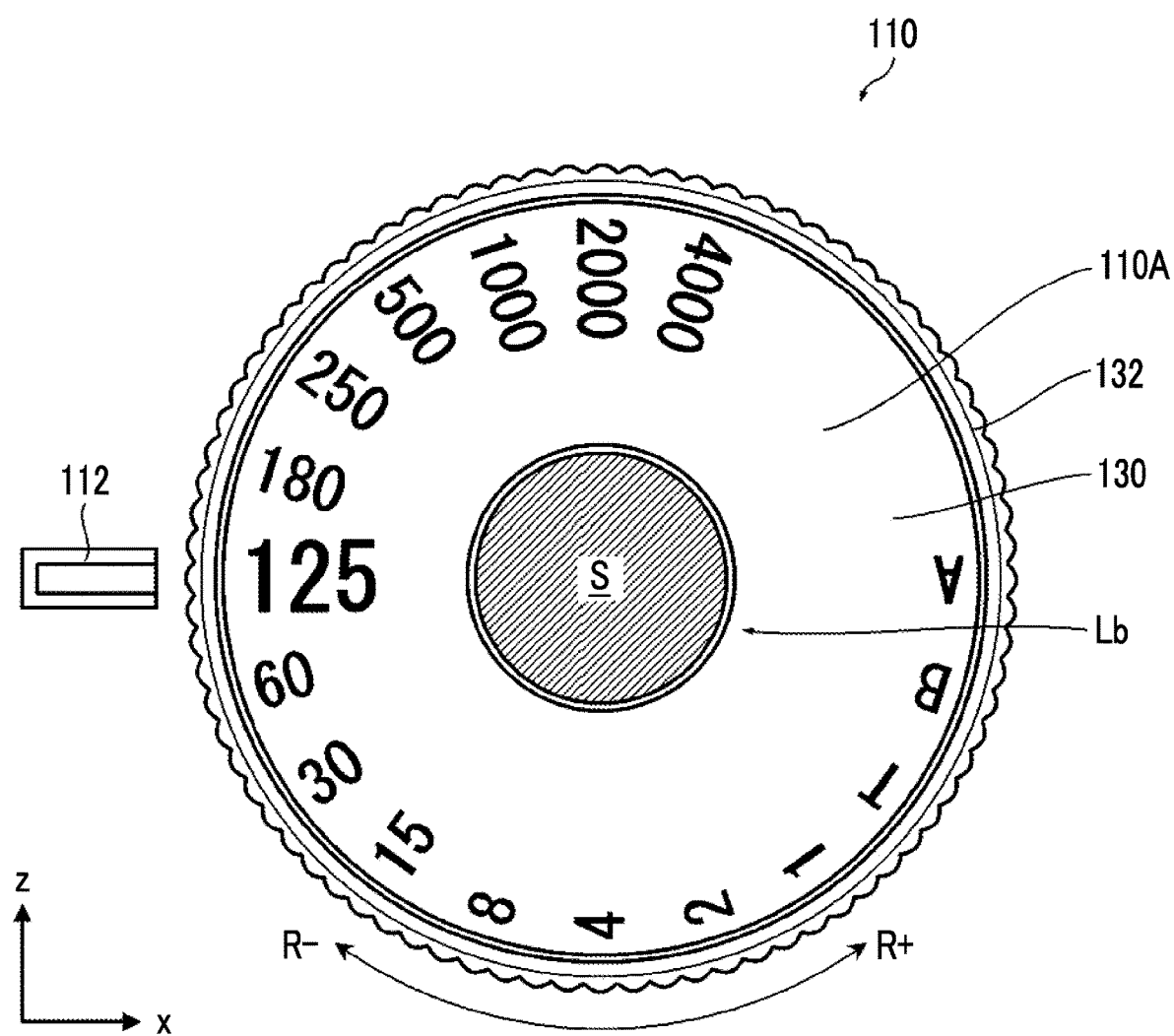
FIG. 20 is a conceptual diagram in a case of limiting a detection region of contact by a contact detection unit.

FIG. 20 is a conceptual diagram in a case of limiting the detection region of the contact by the contact detection unit. In FIG. 20, a region S indicated by diagonal lines is a detection region of the touch sensor 136 which is the contact detection unit.

As shown in FIG. 20, a detection region S of the touch sensor 136 which is the contact detection unit is set in a region corresponding to a display region of the image picture Lb of the lock release button. Accordingly, it is possible to set only the region where the image picture Lb of the lock release button is displayed as the detection region of the contact. Accordingly, since the detection region can be limited to the display region of the image picture Lb of the lock release button, and thus it is possible to prevent the erroneous operation.

In this manner, it is possible to appropriately prevent the erroneous operation by setting only the region where the image picture Lb of the lock release button is displayed as the detection region S of the contact. That is, since only the region where the image picture Lb of the lock release button is displayed is set as the detection region S of the contact, the locked state and the lock release state are not switched even in a case of mistakenly touching another region and thus it is possible to realize the stable operation. Further, since the detection region S of the contact by the contact detection unit is the rotation center, the rotation center can be found even by groping. Accordingly, in the case where the operation is performed in the dark environment, in the case where the operation is performed while the view finder is viewed, or the like, it is possible to ensure the better operability.

<Modification Example of Detection of Contact>

It is preferable to provide a so-called dead zone for the detection of the contact. That is, it is preferable not to detect instantaneous finger contact. Similarly, it is preferable not to detect also a case where the finger is instantaneously released.

In order to provide the dead zone, for example, the contact is detected at regular time interval. In this case, it is determined whether the contact is continuously detected to determine the presence or absence of the contact. In a case where the contact is continuously detected, the contact is determined to be present. In the case of the instantaneous contact, since the contact is not continuously detected, the detection can be eliminated. Further, even in the case where the finger is instantaneously released, it can be recognized that the contact is continued as long as the finger is touched before the next detection.

In this manner, the operation can be performed more stably by determining also duration of the contact and responding with hysteresis.

<Other Examples of Display Form in Case where Lock is Set and in Case where Lock is Released>

In the above-described embodiment, the display color of the image picture Lb of the lock release button is switched between the case where the lock is set and the case where the lock is released. However, a method of switching the display form is not limited thereto. In addition, for example, various forms such as the switching of a background color of the dial plate image, the switching of the brightness of the dial plate image, displaying of a character of "LOCK" in the image picture of the lock release button in the case where the lock is set, and turning on and off of the image picture of the lock release button in the case where the lock is released may be employed.

<Method of Notifying Locked State>

In the case where the switching of the setting is locked, the setting cannot be switched even in the case where the operation dial is rotationally operated. Therefore, in a case where the operation dial is rotationally operated in the locked state, it is preferable to notify the user of the locked state.

(1) Notification by Sound

In a case where the digital camera 1 is provided with a sound output unit such as a speaker, the user may be notified that the lock is set by using the sound output unit. For example, in the case where the operation dial is rotationally operated in the locked state, a sound such as a notification sound or a warning sound is output from the sound output unit. In this case, the digital camera 1 is provided with a sound output control unit. In the case where it is detected that the operation dial is rotationally operated in the locked state, the sound output control unit outputs the sound such as the notification sound or the warning sound from the sound output unit. According to the embodiment, it is possible to notify the user that the locked state is set by the sound and thus to further improve the operability.

Further, in the case where the digital camera 1 is provided with the sound output unit such as the speaker, a pseudo-rotation operation sound may be output in conjunction with the rotation operation of the operation dial. In this case, the rotation operation sound may be switched between the case where the lock is set and the case where the lock is released.

(2) Notification on Monitor

In the case where the monitor is provided as in the digital camera of the above-described embodiment, the user may be notified that the lock is set by using the monitor.

Figure 21:
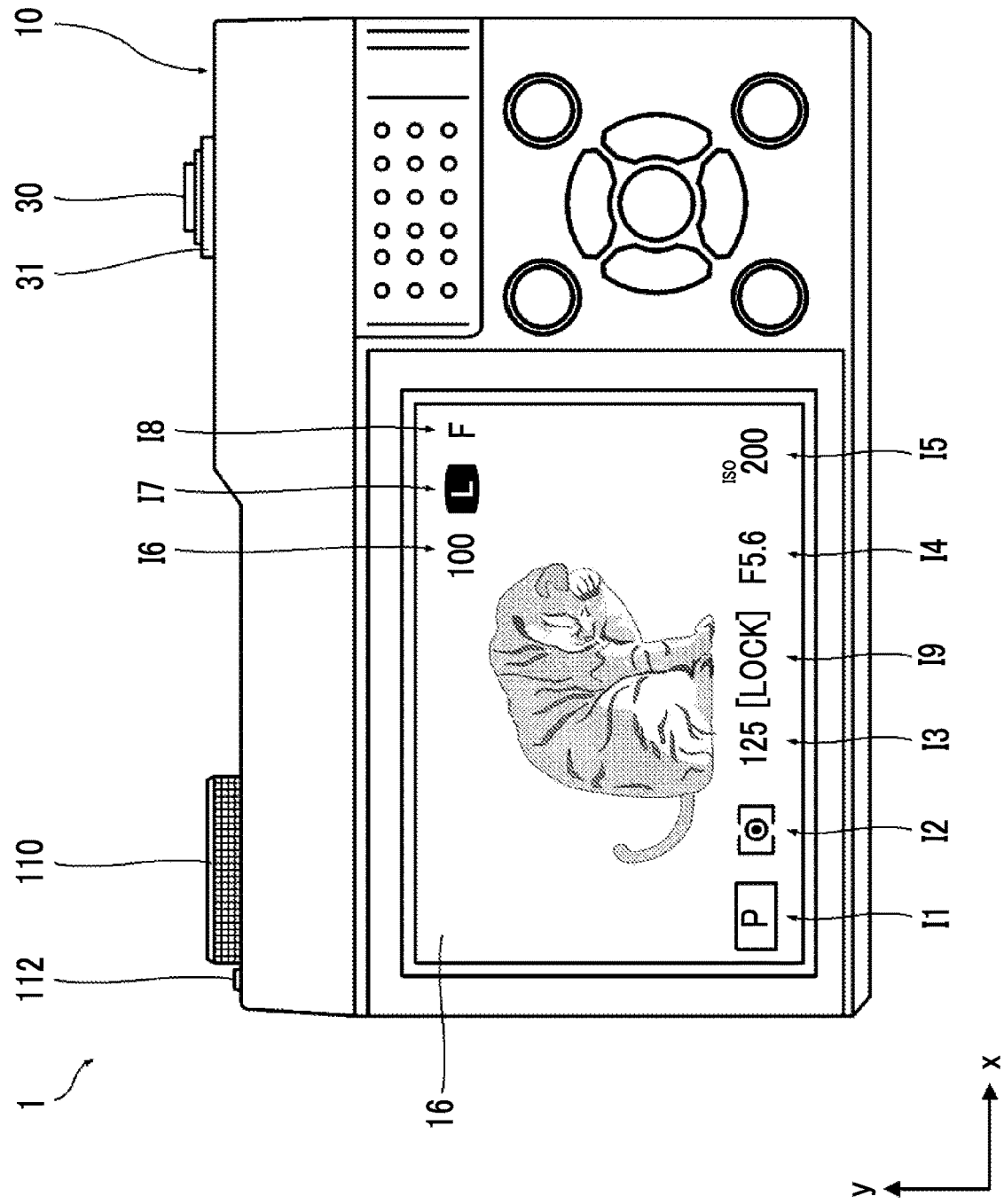
FIG. 21 is a back view of the digital camera showing a notification example by using a monitor.

FIG. 21 is a back view of the digital camera showing a notification example by using the monitor.

Various pieces of imaging information such as an imaging mode I1, a photometry mode I2, a shutter speed I3, an F-number I4, ISO sensitivity I5, the number of capturable images I6, an imaging size I7, and an image quality I8 are displayed on the monitor 16 together with the live view image. In a case where the shutter speed dial 110 which is the operation dial is rotationally operated in the locked state, an icon I9 for warning is displayed on the monitor 16. In the example shown in FIG. 21, an icon formed of a character of "LOCK" is displayed as the icon I9 for warning. According to the embodiment, it is possible to notify the user that the locked state is set by the display and thus to further improve the operability.

In a case where the lock is released, the display of the icon I9 is deleted. That is, the icon I9 for warning is displayed on the monitor 16 only in the case where the lock is set.

In this manner, in the case where the operation dial is rotationally operated in the locked state, it is possible to further improve the operability by notifying the fact on the monitor 16.

The display shown in FIG. 21 is an example. In addition, various display forms such as turning on and off of the display of the shutter speed in the case where the shutter speed dial 110 is rotationally operated in the locked state and the switching of the display of the shutter speed to the icon for warning, for example, the icon formed of the character of "LOCK" in the case where the shutter speed dial 110 is rotationally operated in the locked state may be employed.

In a case where the camera body comprises an electronic view finder, it is preferable to display the same warning or notification also on the electronic view finder. In particular, since the display on the display unit of the operation dial cannot be confirmed in the imaging by using the electronic view finder, it is possible to obtain the better operability by displaying the warning or the notification in the view finder.

<Modification Example of Display Form of Selection Item>

In the above-described embodiment, in the case where the operation dial is used as the shutter speed dial, all the selectable shutter speeds are displayed on the display unit 110A, but only a part of the selectable shutter speeds may be displayed.

Figure 22:
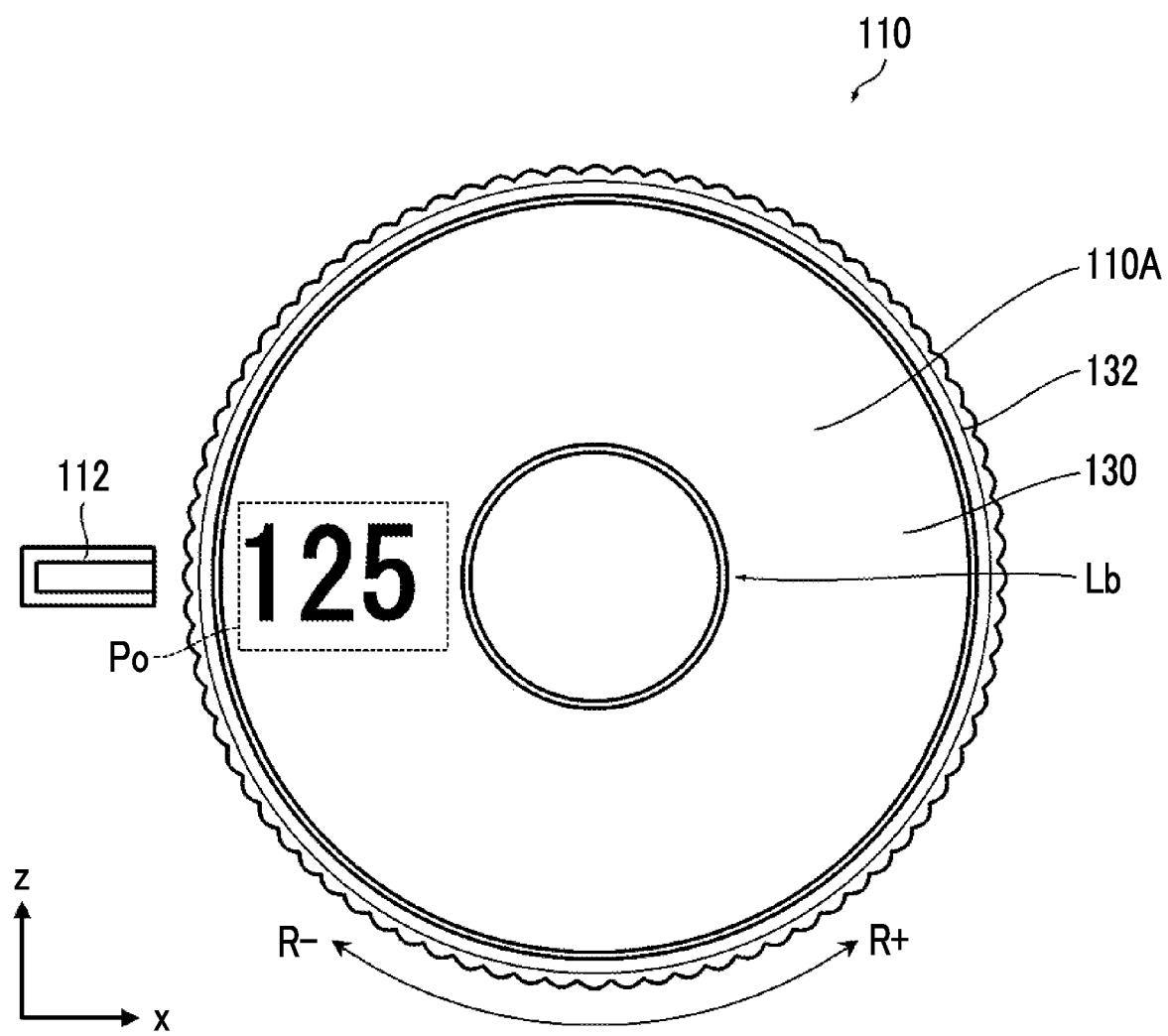
FIG. 22 is a plan view showing a display example of the display unit in a case of displaying only a part of selectable settings on the display unit.

FIG. 22 is a plan view showing a display example of the display unit in a case of displaying only a part of selectable settings on the display unit.

The example shown in FIG. 22 shows a case where only a currently selected shutter speed is displayed on the display unit 110A. In this case, the currently selected shutter speed is displayed at the current setting display position Po.

Figure 23:
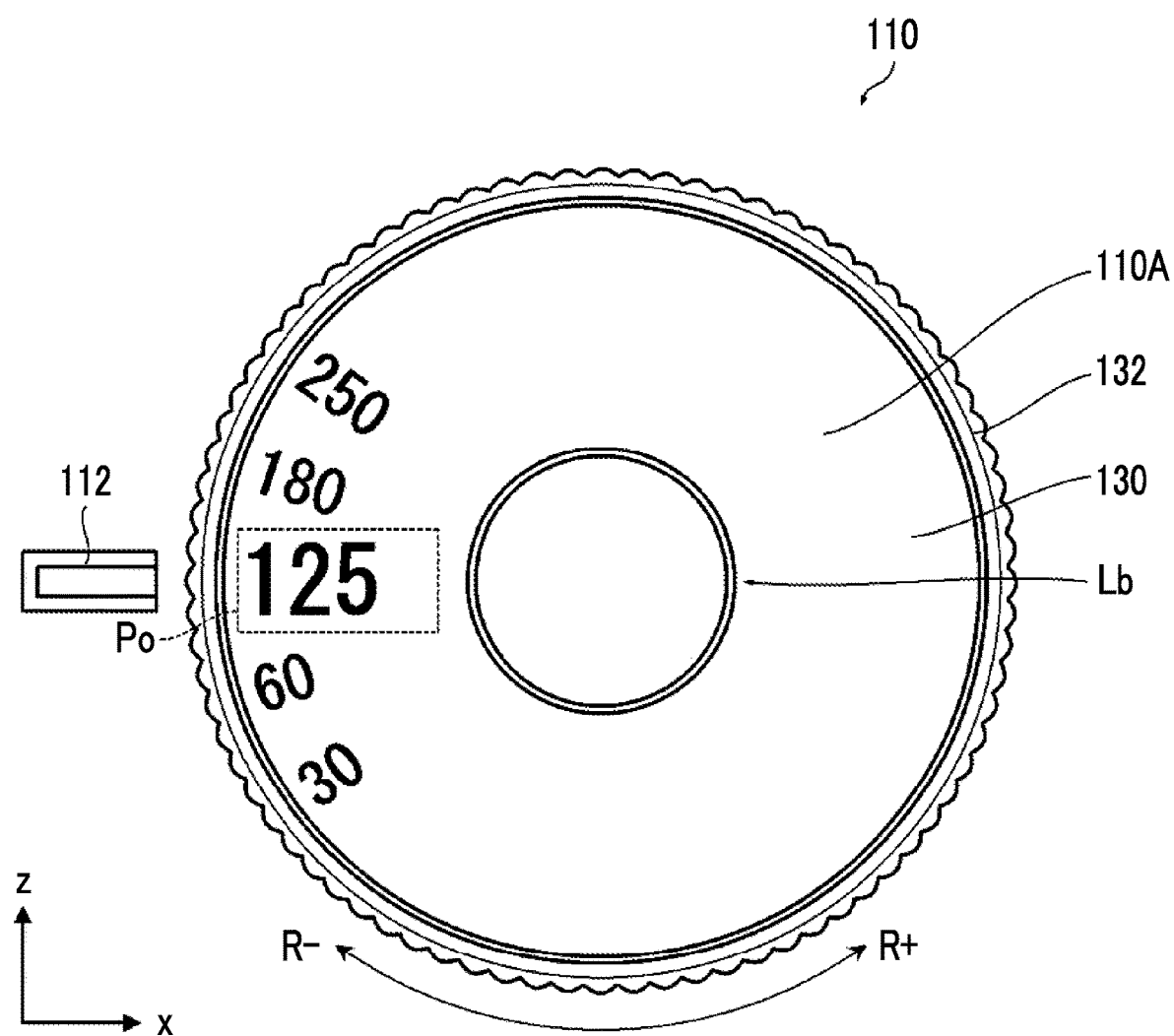
FIG. 23 is a plan view showing another display example of the display unit in a case of displaying only a part of the selectable settings on the display unit.

FIG. 23 is a plan view showing another display example of the display unit in a case of displaying only a part of the selectable settings on the display unit.

The example shown in FIG. 23 shows a case where the currently selected shutter speed and two shutter speeds before and after the currently selected shutter speed are displayed on the display unit 110A. In this case, the currently selected shutter speed is displayed at the current setting display position Po, and a shutter speed set in a case where the shutter speed dial 110 is rotated by one click in the plus direction R+ and a shutter speed set in a case where the shutter speed dial 110 is rotated by two clicks in the plus direction R+ are displayed at regular intervals along the minus rotation direction R− with the current setting display position Po as the reference. Further, a shutter speed set in a case where the shutter speed dial 110 is rotated by one click in the minus direction R− and a shutter speed set in a case where the shutter speed dial 110 is rotated by two clicks in the minus direction R− are displayed at regular intervals along the plus rotation direction R+ with the current setting display position Po as the reference.

The example shown in FIG. 23 shows a case where the shutter speed 1/125 second is selected. In this case, "125" indicating the shutter speed 1/125 second is displayed at the current setting display position Po.

In the case where the shutter speed 1/125 second is selected, the shutter speed is set to 1/180 second in the case where the shutter speed dial 110 is rotated by one click in the plus direction R+. Further, in the case where the shutter speed dial 110 is rotated by two clicks in the plus direction R+, the shutter speed is set to 1/250 second. Therefore, in this case, "180" and "250" are displayed at regular intervals along the minus direction R− with the current setting display position Po as the reference.

Further, in the case where the shutter speed 1/125 second is selected, the shutter speed is set to 1/60 second in the case where the shutter speed dial 110 is rotated by one click in the minus direction R−. Further, in the case where the shutter speed dial 110 is rotated by two clicks in the minus direction R−, the shutter speed is set to 1/30 second. Therefore, in this case, "60" and "30" are displayed at regular intervals along the plus direction R+ with the current setting display position Po as the reference.

In this manner, it is possible to confirm a next settable shutter speed by displaying the currently selected shutter speed and the shutter speeds before and after the currently selected shutter speed, and thus to further improve the operability.

Such display form is particularly effective in a case where a display area of the display unit 110A is small.

Figure 24:
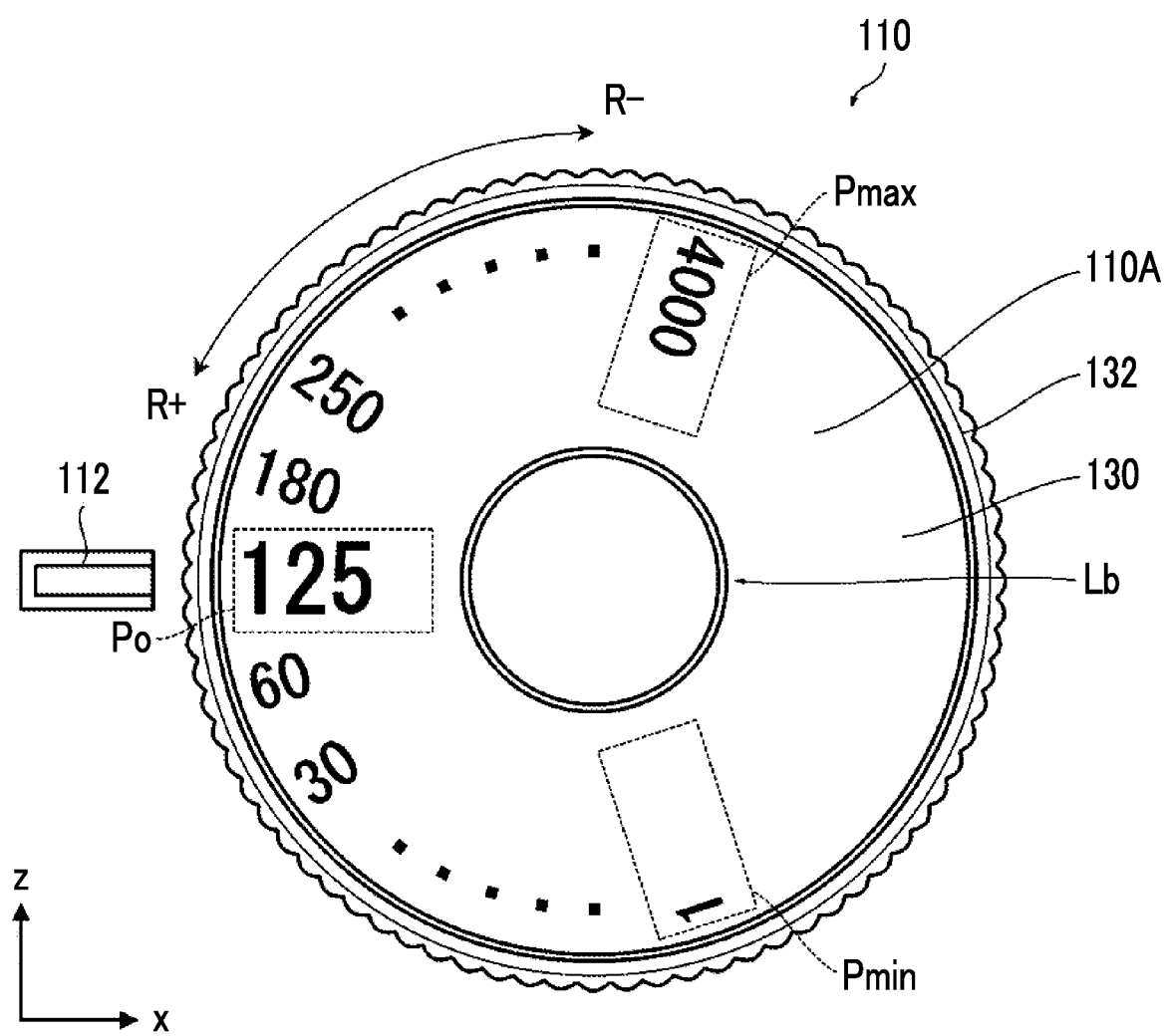
FIG. 24 is a plan view showing still another display example of the display unit in a case of displaying only a part of the selectable settings on the display unit.

FIG. 24 is a plan view showing still another display example of the display unit in a case of displaying only a part of the selectable settings on the display unit.

The example shown in FIG. 24 shows a case where a maximum value and a minimum value of the settable shutter speeds are displayed on the display unit 110A in addition to the currently selected shutter speed and the two shutter speeds before and after the currently selected shutter speed.

The maximum value of the settable items is displayed at a maximum value-display position Pmax, and the minimum value thereof is displayed at a minimum value-display position Pmin. The maximum value-display position Pmax is set on the upper stream side in the rotation direction of the plus rotation direction R+ with the current setting display position Po as the reference, and the minimum value-display position Pmin is set on the upper stream side of the minus rotation direction R− with the current setting display position Po as the reference.

The example shown in FIG. 24 shows a case where the maximum value of the settable shutter speeds is 1/4000 second and the minimum value thereof is 1 second. In this case, "4000" is displayed at the maximum value-display position Pmax and "1" is displayed at the minimum value-display position Pmin. Further, in the example shown in FIG. 24, the intermediate thinned-out shutter speeds are indicated by dots.

In this manner, it is possible to easily grasp a settable range by displaying the settable maximum value and minimum value and thus to further improve the operability.

<Forms of Display Unit>

In the above-described embodiment, the shape of the display unit provided in the operation dial is circular, but the shape of the display unit is not limited thereto. For example, the shape thereof may be rectangular or polygonal.

Figure 25:
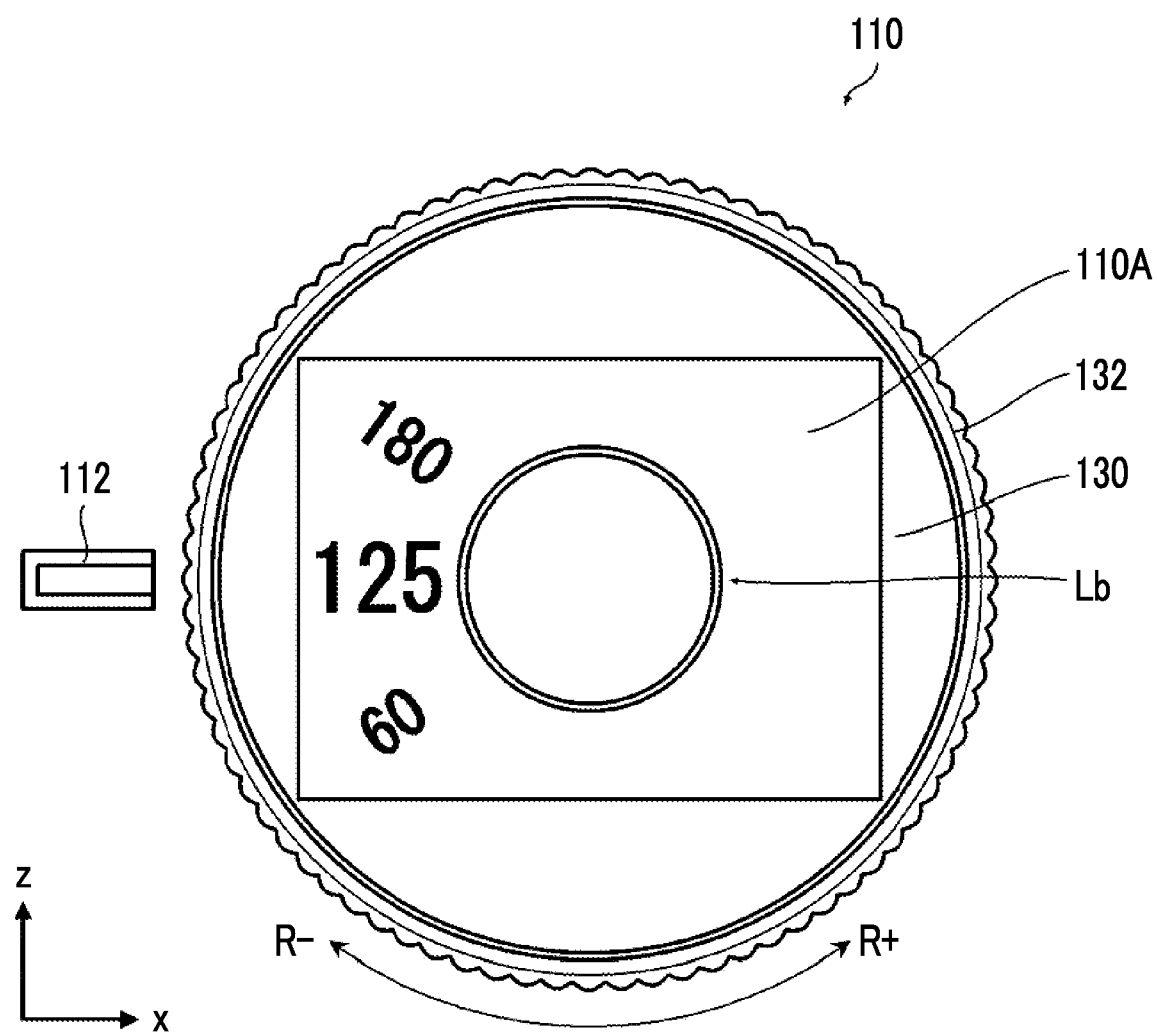
FIG. 25 is a plan view of the shutter speed dial having a rectangular display unit.

FIG. 25 is a plan view of the shutter speed dial having a rectangular display unit.

In the shutter speed dial 110 shown in FIG. 25, the display 130 has a rectangular display surface, and the display surface of the display 130 forms the display unit 110A of the shutter speed dial 110.

In the example shown in FIG. 25, the shutter speeds displayed on the display unit 110A is limited to a certain range. That is, only the currently selected shutter speed and the shutter speeds before and after the currently selected shutter speed are displayed on the display unit 110A.

In this manner, the shape of the display unit 110A is not necessarily required to have a shape matching the inner peripheral shape of the operation ring 132, and various shapes may be employed.

<Other Examples of Display Unit>

In the above-described embodiment, the display forming the display unit is the LCD, but the display forming the display unit is not limited thereto. In addition, the display may be formed of a self-luminous display or the like such as electronic paper, a memory liquid crystal display, or an organic electroluminescent display (EL).

The electronic paper is a thin display that has thinness and visibility at the same level as those of paper, and means a display of which contents to be displayed can be rewritten. The memory liquid crystal display is a liquid crystal display that has a function to be capable of maintaining contents displayed on a screen even though a power supply is turned off. Both of the electronic paper and the memory liquid crystal display can ensure good visibility even in an environment where surroundings are bright. Further, a display on the display section can be confirmed even in a case where the power supply of the camera is turned off.

Further, in a case where the display is formed of the LCD, it is possible to ensure good visibility even in an environment where surroundings are bright by employing a reflective LCD as the display. In the case where the display is formed of the reflective LCD, it is preferable to comprise illumination.

Other Modification Examples

The rotation detection unit is formed of the rotary encoder in the above-mentioned embodiment, but the configuration of the rotation detection unit is not limited thereto. In addition, publicly known rotation detection means, which uses a rotary brush or the like, may also be employed.

Further, the click mechanism is formed of the click groove-metal plate and the click balls in the above-mentioned embodiment, but the configuration of the click mechanism is not limited thereto. In addition, publicly known click mechanism, which uses a leaf spring or the like, may also be employed.

Further, the case where the invention is applied to the digital camera is described in the above-mentioned embodiment, but the application of the invention is not limited thereto. The invention may be applied similarly to a camera that uses a silver halide film. In addition, the invention may also be applied to an electronic apparatus in which a rotary operation dial is built.

Further, the case where the invention is applied to the lens-interchangeable camera is described in the above-mentioned embodiment, but the invention may also be applied similarly to a camera, which is integrated with a lens.

Furthermore, the case where the invention is applied to the non-reflex camera is described in the above-mentioned embodiment, but the invention may also be applied similarly to a reflex camera.

Explanation of References

1: digital camera
2: lens
2a: lens drive unit
10: camera body
14: lens mount
16: monitor
22: grip
24: thumb rest
30: shutter button
31: power supply lever
32: playback button
33: imaging setting button
34: menu/OK button
35: selector button
36: display/BACK button
37: delete button
50: image sensor
52: image sensor drive unit
54: shutter
56: shutter drive unit
58: analog signal processing section
60: image data input unit
62: work memory
64: data memory
66: digital signal processing section
68: recording control unit
70: monitor drive unit
74: operation unit
78: memory card
80: system controller
100: shutter speed setting device
110: shutter speed dial
110A: display unit
110a: sensitivity dial
110b: exposure correction dial
110c: mode dial
112: indicator
114: rotation detection unit
116: setting switching unit
118: display control unit
126: shutter speed dial support frame
126A: support frame main body
126A1: click ball-receiving hole
126B: display support frame
126B1: support part
126B2: base part
130: display
132: operation ring
132A: shaft portion
134: click mechanism
134A: click groove-metal plate
134B: click ball
134C: click spring
134a: click groove
136: touch sensor
140: bearing
142: display drive unit
I1: imaging mode
I2: photometry mode
I3: shutter speed
I5: ISO sensitivity
I6: the number of capturable images
I7: imaging size
I8: image quality
I9: icon for warning
L: optical axis
Lb: image picture
Pmax: maximum value-display position
Pmin: minimum value-display position
Po: current setting display position
R+: plus rotation direction
R−: minus rotation direction
S: detection region of touch sensor
S10 to S17: setting processing of shutter speed
S20 to S26: processing of lock/lock release

What is claimed is:

1. A setting device comprising:
an operation dial that is rotatable;
a display unit that is provided on an upper surface of the operation dial;
a contact detection unit that detects contact with the upper surface of the operation dial at time intervals;
a rotation detection unit that detects a rotation of the operation dial;
a setting switching unit that sequentially switches a setting according to the rotation of the operation dial only in a case where the contact with the upper surface of the operation dial is continuously detected, wherein the continuous detection is a detection of contact over multiple time intervals; and
a display control unit that controls a display of the display unit,
wherein the display control unit displays an image picture of a lock release button on the rotation center of the operation dial and displays a currently selected setting at a current setting display position and
wherein the contact detection unit recognizes that the contact is continuously detected in a case where the contact with the upper surface of the operation dial is released and then contacted between detections.

2. The setting device according to claim 1,
wherein the contact detection unit detects the contact with the rotation center of the operation dial.

3. The setting device according to claim 1,
wherein the contact detection unit detects contact with a display section of the image picture of the lock release button.

4. The setting device according to claim 2,
wherein the contact detection unit detects contact with a display section of the image picture of the lock release button.

5. The setting device according to claim 1,
wherein the contact detection unit has a detection region corresponding to a display region of the image picture of the lock release button.

6. The setting device according to claim 2,
wherein the contact detection unit has a detection region corresponding to a display region of the image picture of the lock release button.

7. The setting device according to claim 3,
wherein the contact detection unit has a detection region corresponding to a display region of the image picture of the lock release button.

8. The setting device according to claim 4,
wherein the contact detection unit has a detection region corresponding to a display region of the image picture of the lock release button.

9. The setting device according to claim 1,
wherein the display control unit displays the currently selected setting displayed at the current setting display position and selectable settings side by side on the same circumference.

10. The setting device according to claim 2,
wherein the display control unit displays the currently selected setting displayed at the current setting display position and selectable settings side by side on the same circumference.

11. The setting device according to claim 3,
wherein the display control unit displays the currently selected setting displayed at the current setting display position and selectable settings side by side on the same circumference.

12. The setting device according to claim 4,
wherein the display control unit displays the currently selected setting displayed at the current setting display position and selectable settings side by side on the same circumference.

13. The setting device according to claim 5,
wherein the display control unit displays the currently selected setting displayed at the current setting display position and selectable settings side by side on the same circumference.

14. The setting device according to claim 6,
wherein the display control unit displays the currently selected setting displayed at the current setting display position and selectable settings side by side on the same circumference.

15. The setting device according to claim 9,
wherein the display control unit displays the currently selected setting displayed at the current setting display position larger than other selectable settings.

16. A camera comprising:
the setting device according to claim 1.

17. The camera according to claim 16, further comprising:
a sound output unit that notifies by a sound that locked state is set in a case where the operation dial is rotated in the case of the locked state.

18. The camera according to claim 16, further comprising:
a monitor that displays that locked state is set in the case where the operation dial is rotated in the case of the locked state.

19. A setting method comprising:
detecting contact with an upper surface of an endlessly rotatable operation dial at time intervals;
validating switching of a setting by the operation dial in a case where the contact with the upper surface of the operation dial is continuously detected, wherein the continuous detection is a detection of contact over multiple time intervals;
switching sequentially the setting in response to a rotation operation of the operation dial in a case where the switching of the setting by the operation dial is valid;
displaying an image picture of a lock release button on the rotation center of the operation dial; and
displaying a currently selected setting at a current setting display position, and
wherein the contact is continuously detected in a case where the contact with the upper surface of the operation dial is released and then contacted between detections.

20. A non-transitory computer readable recording medium storing a setting program causing a computer to realize functions comprising:
a function of determining the presence or absence of contact with an upper surface of an operation dial based on an output from a contact detection unit provided on the upper surface of the endlessly rotatable operation dial at time intervals;
a function of validating switching of a setting by the operation dial in a case where the contact with the upper surface of the operation dial is continuously determined to be present, wherein the continuous detection is a detection of contact over multiple time intervals;
a function of switching sequentially the setting in response to a rotation operation of the operation dial in a case where the switching of the setting by the operation dial is valid;
a function of displaying an image picture of a lock release button on the rotation center of the operation dial; and
a function of displaying a currently selected setting at a current setting display position, and
wherein the contact is continuously detected in a case where the contact with the upper surface of the operation dial is released and then contacted between detections.

* * * * *